(12) United States Patent  
Grondin et al.

(10) Patent No.: US 9,561,830 B2
(45) Date of Patent: Feb. 7, 2017

(54) BACKREST FOR A STRADDLE-SEAT VEHICLE

(71) Applicant: BOMBARDIER RECREATIONAL PRODUCTS INC, Valcourt (CA)

(72) Inventors: Patrick Grondin, Sherbrooke (CA); David Labbe, Acton Vale (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 247 days.

(21) Appl. No.: 14/068,597

(22) Filed: Oct. 31, 2013

(65) Prior Publication Data

US 2014/0084644 A1   Mar. 27, 2014

Related U.S. Application Data

(60) Provisional application No. 61/720,647, filed on Oct. 31, 2012.

(51) Int. Cl.
*B62J 1/28* (2006.01)
*B62J 1/12* (2006.01)

(52) U.S. Cl.
CPC .. *B62J 1/28* (2013.01); *B62J 1/12* (2013.01); *Y10T 29/49826* (2015.01)

(58) Field of Classification Search
USPC .............. 297/215.12, 215.11, 215.1
See application file for complete search history.

(56) References Cited

U.S. PATENT DOCUMENTS

| 3,741,596 | A | * | 6/1973 | Cate | B62J 6/04 |
| | | | | | 297/215.11 |
| 3,850,353 | A | * | 11/1974 | Foulds | 224/418 |
| 4,466,660 | A | * | 8/1984 | Mabie | 297/215.11 |
| 5,468,052 | A | * | 11/1995 | Vaughn | 297/352 |
| 5,544,937 | A | * | 8/1996 | Hanagan | B29C 44/12 |
| | | | | | 297/195.12 |
| 5,588,698 | A | * | 12/1996 | Hsueh | 297/184.11 |
| 6,007,150 | A | * | 12/1999 | Clerkin et al. | 297/215.12 |
| 6,422,648 | B1 | | 7/2002 | Hanagan | |
| 6,551,226 | B1 | * | 4/2003 | Webber et al. | 482/148 |
| 6,651,765 | B1 | | 11/2003 | Weinzierl | |
| 6,655,740 | B1 | | 12/2003 | Hanagan | |
| 6,761,401 | B1 | * | 7/2004 | McGlynn | 297/215.12 |
| 7,104,352 | B2 | | 9/2006 | Weinzierl | |
| 7,556,114 | B2 | * | 7/2009 | Hanagan | 180/219 |
| 7,938,760 | B1 | * | 5/2011 | Webber et al. | 482/97 |

(Continued)

*Primary Examiner* — David E Allred
(74) *Attorney, Agent, or Firm* — BCF LLP

(57) ABSTRACT

A kit for assembling a backrest on a saddle-type vehicle seat selectively connected to the frame and including at least one seat passage extending therethrough. A mounting plate is adapted to be disposed between the seat and the frame. An adapter, adapted to be connected to the mounting plate or integrally formed therewith, includes at least one adapter passage having an open end facing away from the mounting plate. An inverted U-shaped seat mount includes two posts and a connection member connected between their respective first end portions. A second end portion is adapted to be selectively received in the at least one adapter passage through the open end thereof. A back support is adapted to be pivotally connected to the seat mount. At least one fastener for attaching the mounting plate to the seat. Methods for assembling the backrest onto the seat are disclosed.

13 Claims, 27 Drawing Sheets

(56) References Cited

U.S. PATENT DOCUMENTS

| | | |
|---|---|---|
| 7,981,010 B1* | 7/2011 | Webber et al. ................ 482/96 |
| 8,272,460 B2* | 9/2012 | Song et al. .................. 180/6.24 |
| 8,371,652 B2* | 2/2013 | Revell .......................... 297/352 |
| 2002/0043544 A1* | 4/2002 | Caneba ............... A45C 13/262 |
| | | 224/584 |
| 2002/0089218 A1* | 7/2002 | Hanagan ................. 297/215.12 |
| 2006/0290179 A1* | 12/2006 | Reinhard ................ 297/215.11 |
| 2007/0249246 A1* | 10/2007 | Neidert et al. ............... 441/130 |
| 2008/0084097 A1* | 4/2008 | Botting ..................... B62J 1/28 |
| | | 297/215.12 |
| 2010/0307852 A1* | 12/2010 | Aramayo et al. ............ 180/219 |
| 2011/0074188 A1* | 3/2011 | Freer et al. ............. 297/188.14 |

* cited by examiner

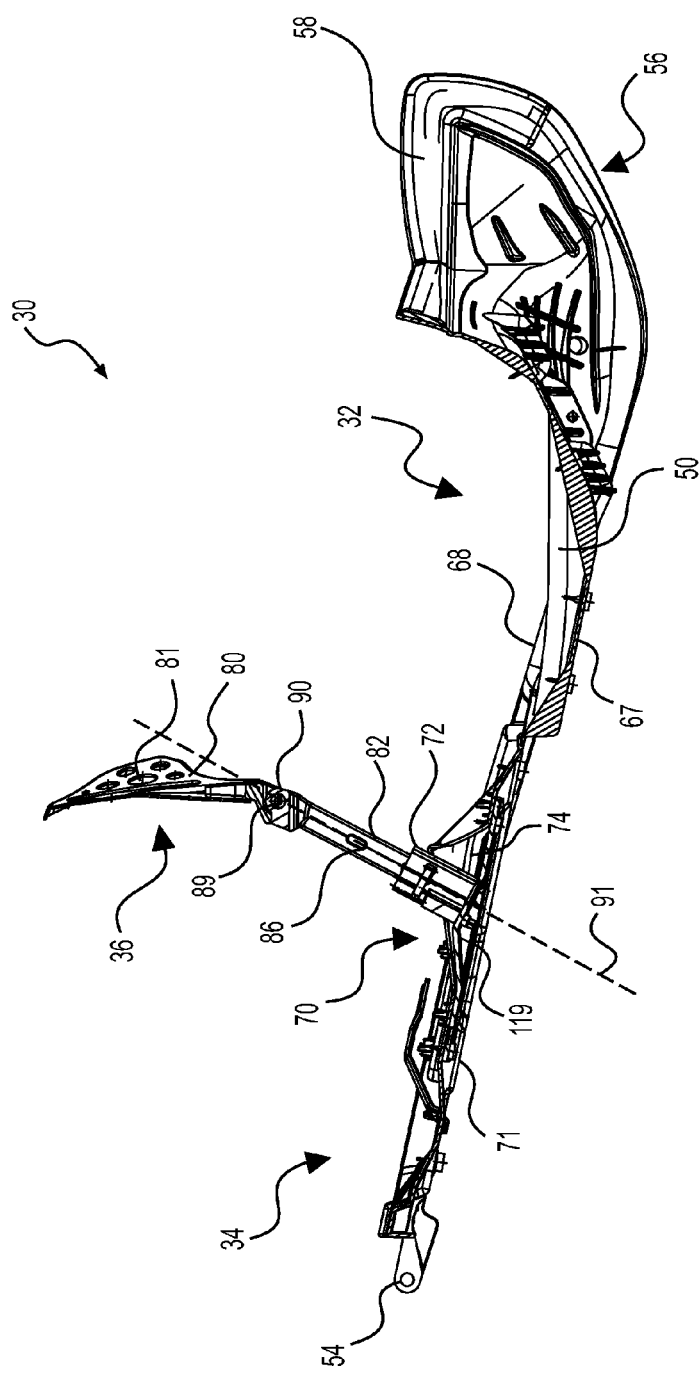

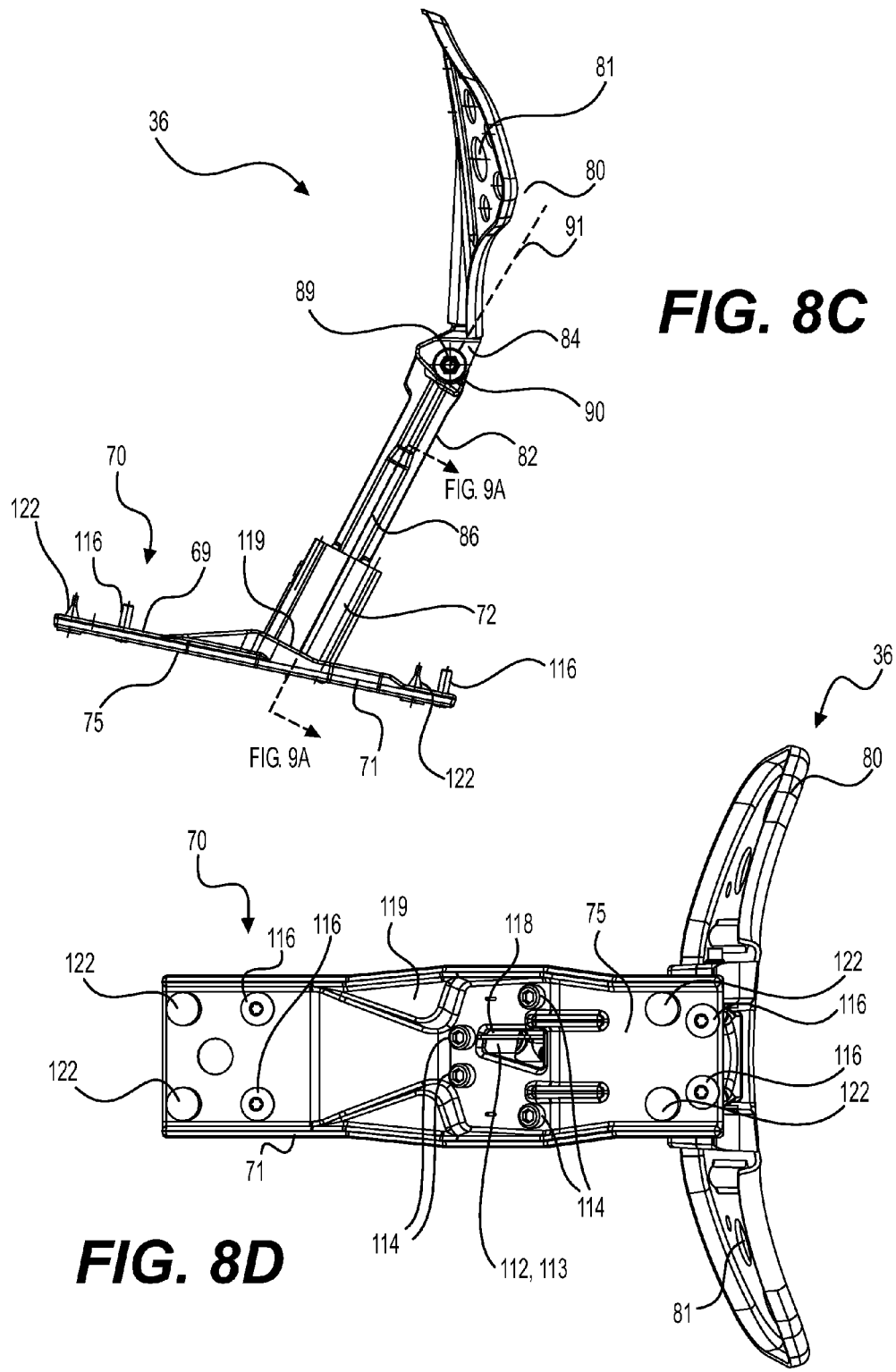

BACKREST FOR A STRADDLE-SEAT VEHICLE

CROSS-REFERENCE

The present application claims priority to U.S. Provisional Application No. 61/720,647 filed on Oct. 31, 2012, the entirety of which is incorporated herein by reference.

FIELD OF THE INVENTION

The present invention relates generally to backrests for straddle-seat vehicles.

BACKGROUND

Straddle seats are provided on many different kinds of vehicles, such as motorcycles, snowmobiles and three-wheeled vehicles. Straddle-seat vehicles may be used for touring purposes where the driver and one or more passengers remain seated on the vehicle for long periods of time. Other uses of straddle-seat vehicles may place more emphasis on maximizing performance from the vehicle and/or driver.

A backrest is sometimes included on a straddle-seat to increase the comfort of the driver and passengers. It is desirable to make the vehicle comfortable for different users and for different usage modes. Some drivers may like to change the configuration of the backrest for different uses of the vehicle. Some drivers may, for example, prefer not to have a backrest while others may prefer to have it be disposed at a certain angle with respect to the seat. It would also be desirable to have the ability to add a backrest to a straddle-seat after the vehicle not provided with a backrest has been purchased.

There is thus a need for a versatile, adjustable and removable backrest. It is desirable to have a backrest for a straddle seat that is comfortable in use, as well as easy to install and adjust according to the preferences of a driver and/or passenger.

SUMMARY

It is an object of the present invention to ameliorate at least some of the inconveniences present in the prior art.

In one aspect, a seat for a vehicle includes a seat base having a bottom surface adapted to be disposed on a vehicle frame and a seat cushion having a lower surface disposed on the seat base. The seat cushion has an outer surface opposite the lower surface. A seat base passage is defined in the seat base. A seat cushion passage extends in the seat cushion from the outer surface of the seat cushion and connecting to the seat base passage. Also included is a lock having a member associated with the seat base passage and a backrest. The backrest includes a post having a lower portion selectively disposed in the seat base passage, a middle portion adjacent to the lower portion, and a connection portion adjacent to the middle portion. A back support portion is pivotably mounted on the post in the connection portion. A pivot axis is defined in the connection portion. One of a notch and a hole is defined in a surface of the lower portion, and a portion of the surface of the lower portion is an angled surface. The angled surface extends at an inward angle towards a central axis of the post in a direction away from the middle portion. The one of the notch and the hole is disposed between the angled surface and the middle portion. The member is selectively disposed in the one of the notch and the hole to removably retain the lower portion in the seat base passage.

In another aspect, the present provides a backrest for a vehicle seat. The vehicle seat includes a seat base with a seat base passage, and a seat cushion disposed on the seat base. The backrest includes a post having a lower portion, a middle portion adjacent to the lower portion, and a connection portion adjacent to the middle portion. The lower portion is adapted to be received in the seat base passage and to be rigidly and removably retained therein by a member connected to the seat base. A back support portion is pivotably mounted on the post in the connection portion. A pivot axis is defined in the connection portion. One of a notch and a hole is defined in a surface of the lower portion. The one of a notch and a hole is adapted to engage the member. A portion of the surface of the lower portion is an angled surface extending toward a central axis of the post in a direction away from the middle portion. The one of the notch and the hole is disposed between the angled surface and the middle portion.

In another aspect, the present provides a seat for a vehicle. The seat includes a seat base having a bottom surface adapted to be disposed on a vehicle frame, and a seat cushion having a lower surface disposed on the seat base. The seat cushion has an outer surface opposite the lower surface. Two receptacles are connected to the bottom surface of the seat base. Two seat cushion passages extend in the seat cushion, each seat cushion passage extending from the outer surface of the seat cushion and connecting to one of the two receptacles. The seat also includes a backrest having a forked seat mount having two posts connected to each other. Each post has a lower portion selectively disposed in one of the two seat base passages, a middle portion adjacent to the lower portion, and a connection portion adjacent to the middle portion. A back support portion of the backrest is pivotably mounted on the two posts in their respective connection portions. A pivot axis of the backrest is defined in the connection portion. The lower portion of each post is selectively received in one of the two receptacles, and rigidly and removably retained therein. The middle portion of each post extends in the corresponding one of the two seat cushion passages when the lower portion is retained in the one of the two receptacles. The connection portion of the two posts and the pivot axis are disposed outside the seat cushion when the lower portion of the two posts is retained in the two receptacles.

In yet another aspect, the present provides a backrest for a vehicle seat. The vehicle seat has a seat base with at least one receptacle. A seat cushion disposed on the seat base has at least one passage extending through the seat cushion, from a surface of the seat cushion disposed opposite the seat base and connecting to the at least one receptacle of the seat base. The backrest includes a seat mount with at least one post. The at least one post has a lower portion, a middle portion adjacent to the lower portion, and a connection portion adjacent to the middle portion. A back support portion of the backrest is pivotably mounted on the connection portion of the at least one post. A pivot axis is defined in the connection portion. The lower portion is adapted to be received in the at least one receptacle of the seat base, and to be rigidly and removably retained therein. The middle portion is adapted to extend in the at least one passage of the seat cushion, and the connection portion and pivot axis are adapted to be disposed outside the seat cushion when the lower portion is retained in the at least one receptacle.

In another aspect, a kit is provided for assembly of a backrest on a saddle-type seat of a motor vehicle. The vehicle has a vehicle frame. The seat has at least one seat passage extending therethrough. The seat is selectively connected to the vehicle frame. The kit includes a mounting plate adapted to be disposed between the seat and the vehicle frame when the seat is connected to the vehicle frame. An adapter is either adapted to be connected to the mounting plate or integrally formed with the mounting plate. The adapter includes at least one adapter passage having an open end facing away from the mounting plate. An inverted U-shaped seat mount has two posts and a connection member connected between respective first end portions of the two posts. A second end portion of each of the two posts is adapted to be selectively received in the at least one adapter passage through the open end thereof. A back support is adapted to be pivotally connected to the seat mount. At least one fastener is included for attaching the mounting plate to the seat.

In another aspect, the mounting plate is adapted to be connected to a bottom surface of the seat.

In yet another aspect, at least one resilient bumper is adapted to be placed between the mounting plate and the vehicle frame to reduce transmission of vibrations from the vehicle frame to the back support In another aspect, the adapter is adapted to be connected to the mounting plate. The kit also includes at least one adapter fastener for fastening the adapter to the mounting plate.

In a further aspect, the adapter is adapted to be disposed at least in part in the at least one seat passage when the adapter is connected to the mounting plate, and the mounting plate is disposed between the seat and the vehicle frame.

In an additional aspect, the second end portion of each of the two posts is adapted to be inserted through a portion of the at least one seat passage into the at least one adapter passage when the mounting plate is disposed between the seat and the vehicle frame.

In an additional aspect, the two posts are adapted to extend forwardly and upwardly from the second end portion to the first end portion with respect to a bottom surface of the seat.

In another aspect, each of the two posts defines a respective central axis, the central axes of the two posts being parallel to each other.

In another aspect, the second end portion of at least one of the two posts comprises an angled surface adapted to be disposed at least partly in the at least one adapter passage, the angled surface being angled toward a central axis defined by the at least one of the two posts in a direction away from the first end portion thereof.

In a further aspect, one of a notch and a hole is defined in a surface of at least one of the two posts in the second end portion thereof. The one of the notch and the hole is adapted to selectively receive a lock member for retaining the second end portion of the two posts in the at least one adapter passage.

In another aspect, the kit includes a lock having the lock member adapted to be received in the one of the notch and the hole.

In a further aspect, the adapter includes a slot extending into the at least one passage, and the lock member is adapted to extend through the slot of the adapter into the one of the notch and the hole.

In a further aspect, the lock further comprises a push-plate connected to the lock member for manipulation thereof.

In an additional aspect, the mounting plate has a slot extending therethrough. The lock is adapted to be fixed to at least one of the mounting plate and the adapter. The push-plate is adapted to extend through the slot of the mounting plate when the lock is fixed to the at least one of the mounting plate and the adapter.

In another aspect, the at least one adapter passage is two adapter passages. Each of the two adapter passages is adapted to selectively receive the second end portion of a corresponding one of the two posts of the seat mount. Each of the two adapter passages has a closed end opposite to the open end.

In yet another aspect, two resilient spacers are included in the kit. Each of the two resilient spacers is adapted to be placed within one of the two adapter passages near the closed end thereof. Each of the two resilient spacers is adapted to selectively receive at least a portion of the second end portion of one of the two posts.

In a further aspect, a seat cover included in the kit is adapted to cover the seat and has at least one opening aligned with at least one of the at least one seat passage.

In another aspect, at least one of the at least one opening of the seat cover is formed by an X-shaped slit.

In an additional aspect, a frame spacer is adapted to be placed between the mounting plate and the vehicle frame when the mounting plate is disposed between the seat and the vehicle frame.

In another aspect, a method is provided of installing a backrest on a saddle-type seat of a motor vehicle. The seat has a top surface, a bottom surface, and a seat passage extending upwardly and forwardly to the top surface, the method includes moving at least a portion of the seat with respect to a vehicle frame to access the bottom surface and placing a mounting assembly on the bottom surface of the seat to align an adapter passage thereof extending toward the top surface of the seat with the seat passage. The mounting assembly is fastened to the seat. A seat mount is inserted into the seat passage from a top surface of the seat and into the passage of the mounting assembly. The seat mount is locked to at least one of the seat and the mounting assembly. The at least one portion of the seat is moved with respect to the vehicle frame to reposition the bottom surface of the seat on the vehicle frame, the seat having the mounting assembly fastened thereto.

In a further aspect, the seat mount is inserted into the seat passage through a seat cover covering at least a portion of the seat including the seat passage.

In yet another aspect, the mounting assembly includes a mounting plate and an adapter. The adapter has the adapter passage. The method includes connecting the adapter to the mounting plate.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted). The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 4C is a cross-sectional view of the seat of FIG. 4A taken along the line 4C-4C of FIG. 4B;

FIGS. 8B, 8C and 8D are respectively a rear elevation view, right side elevation view, and a bottom plan view of the backrest and mounting assembly of FIG. 8A;

DETAILED DESCRIPTION

Embodiments of the present invention will be described with respect to a three-wheeled vehicle. However, it contemplated that aspects of the embodiments of the present invention could also be used on other types of vehicles, such as all-terrain vehicles (ATVs), motorcycles, snowmobiles, and personal watercraft.

Figure 1A:
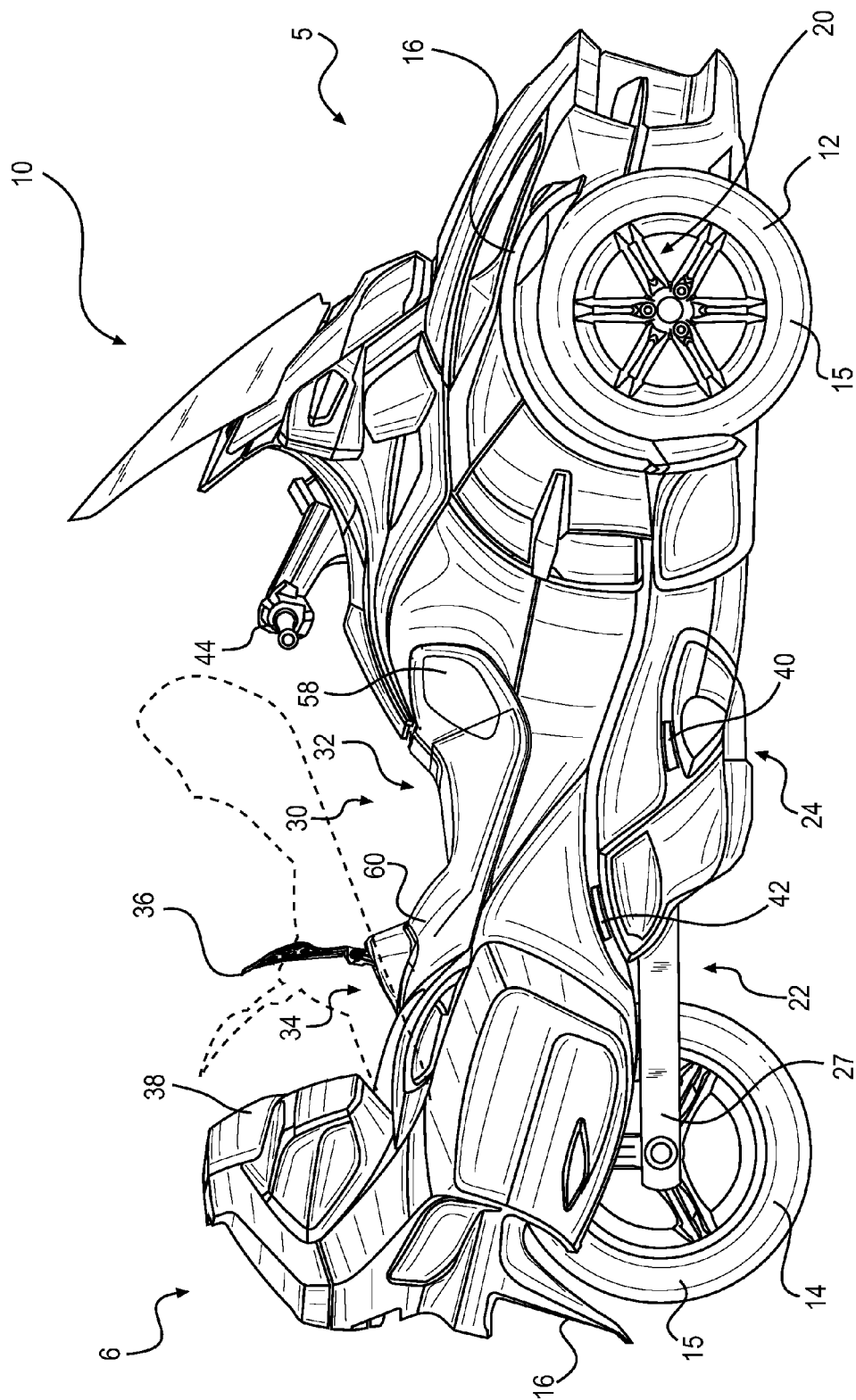
FIG. 1A is a right side elevation view of a vehicle.
Figure 1B:
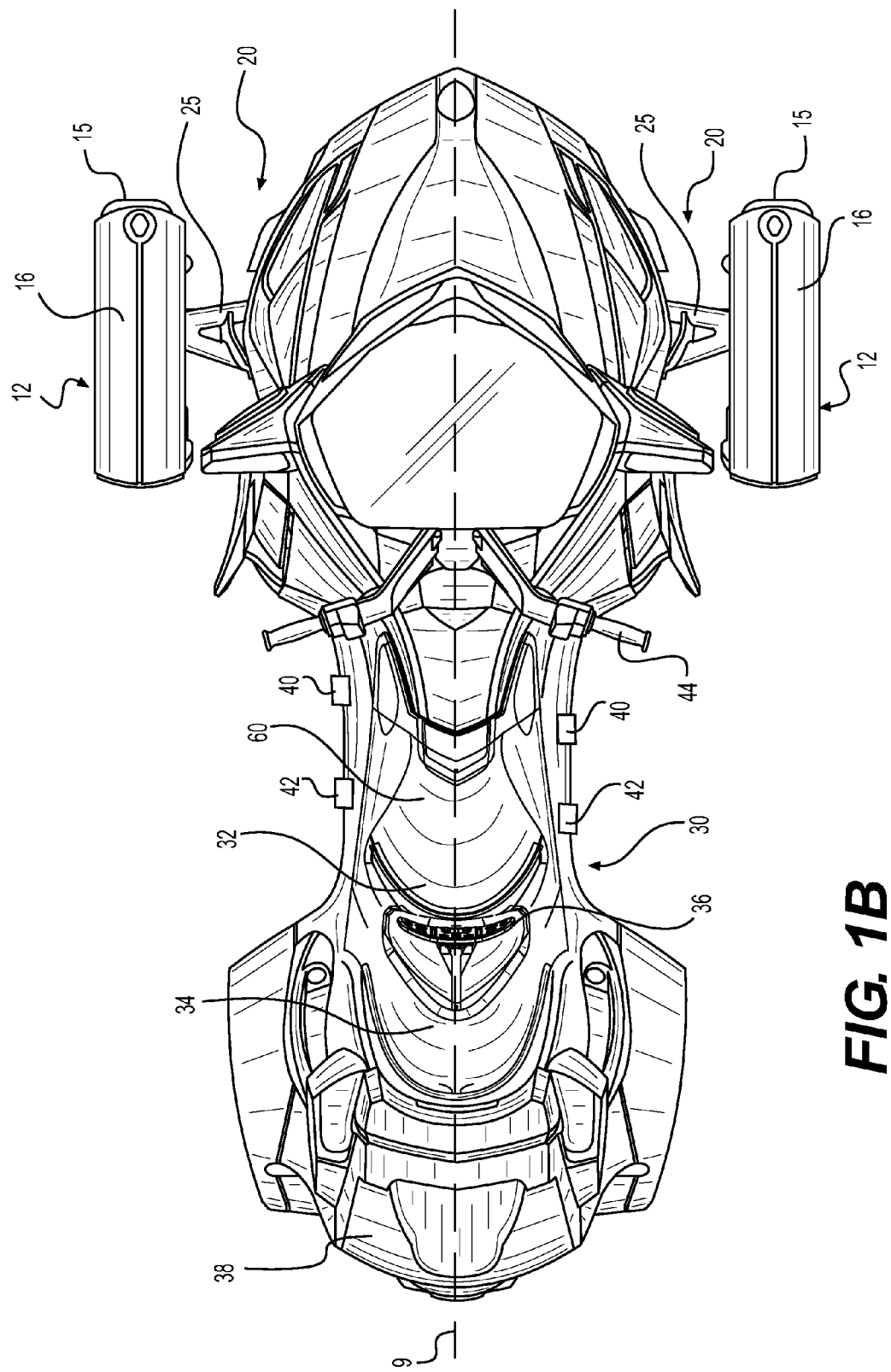
FIG. 1B is a top plan view of the vehicle of FIG. 1A.
Figure 2A:
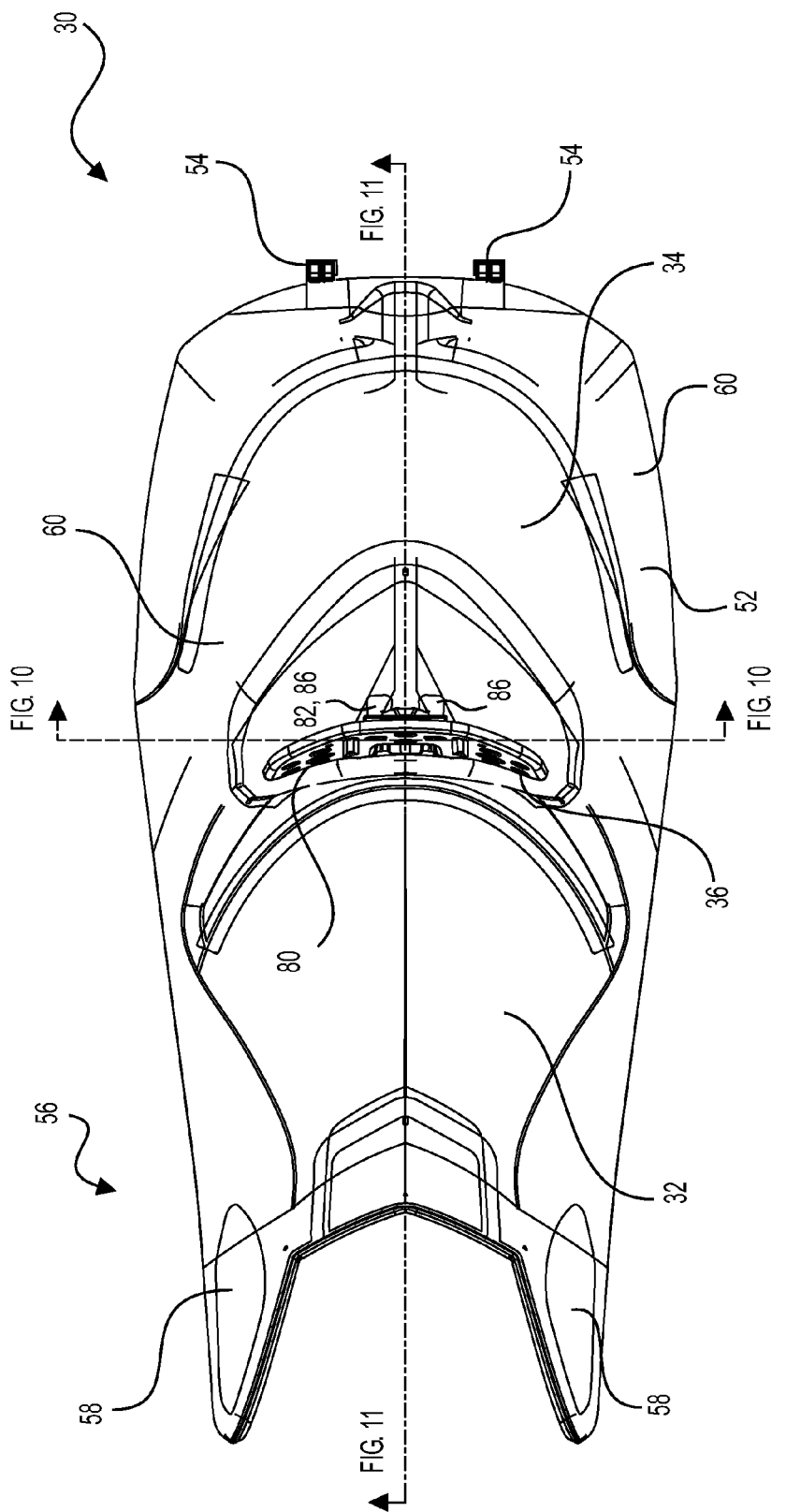
FIG. 2A is a top plan view of the seat of the vehicle of FIG. 1A, shown in isolation.
Figure 2B:
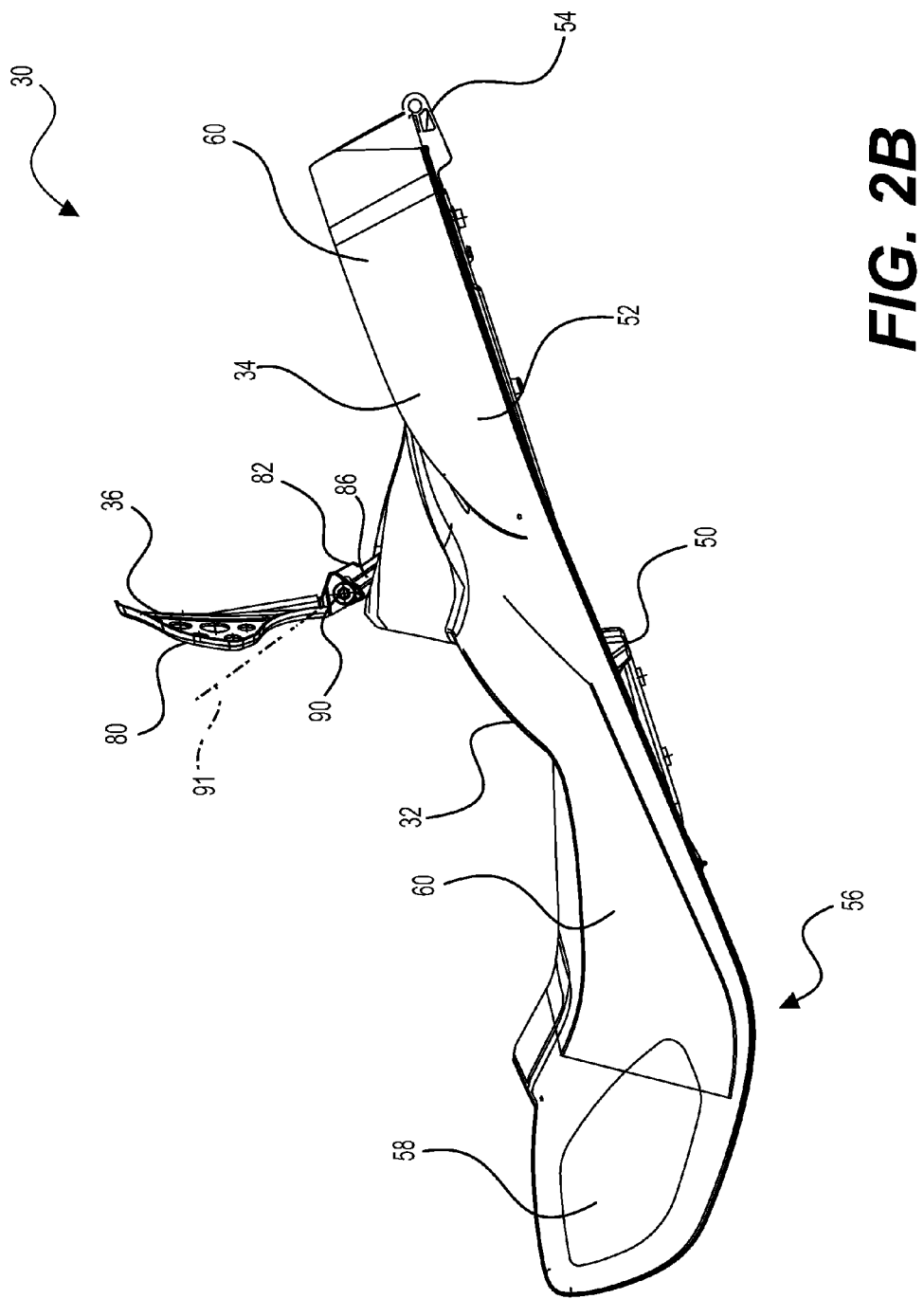
FIG. 2B is a left side elevation view of the seat of FIG. 2A.
Figure 3A:
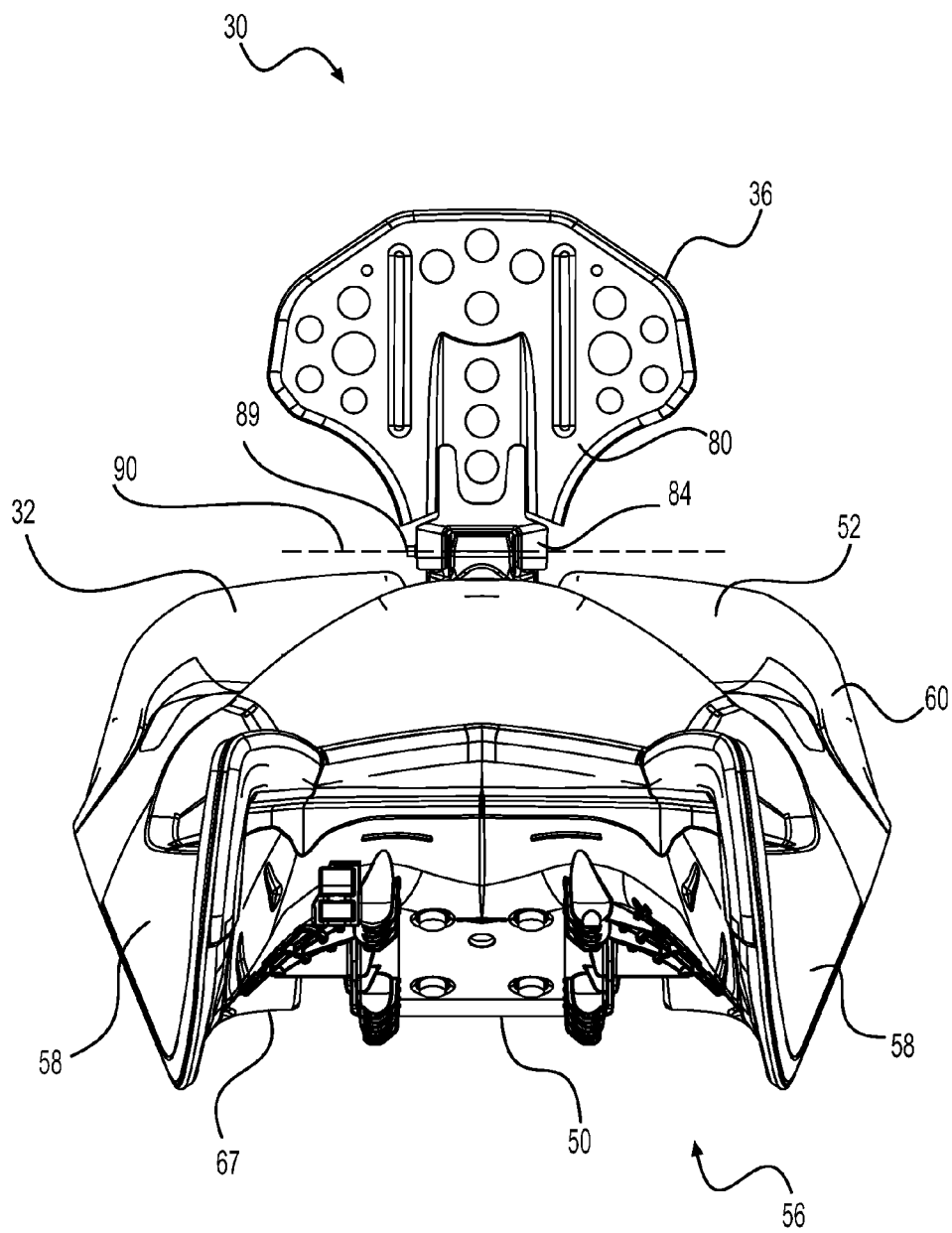
FIG. 3A is a front elevation view of the seat of FIG. 2A.
Figure 3B:
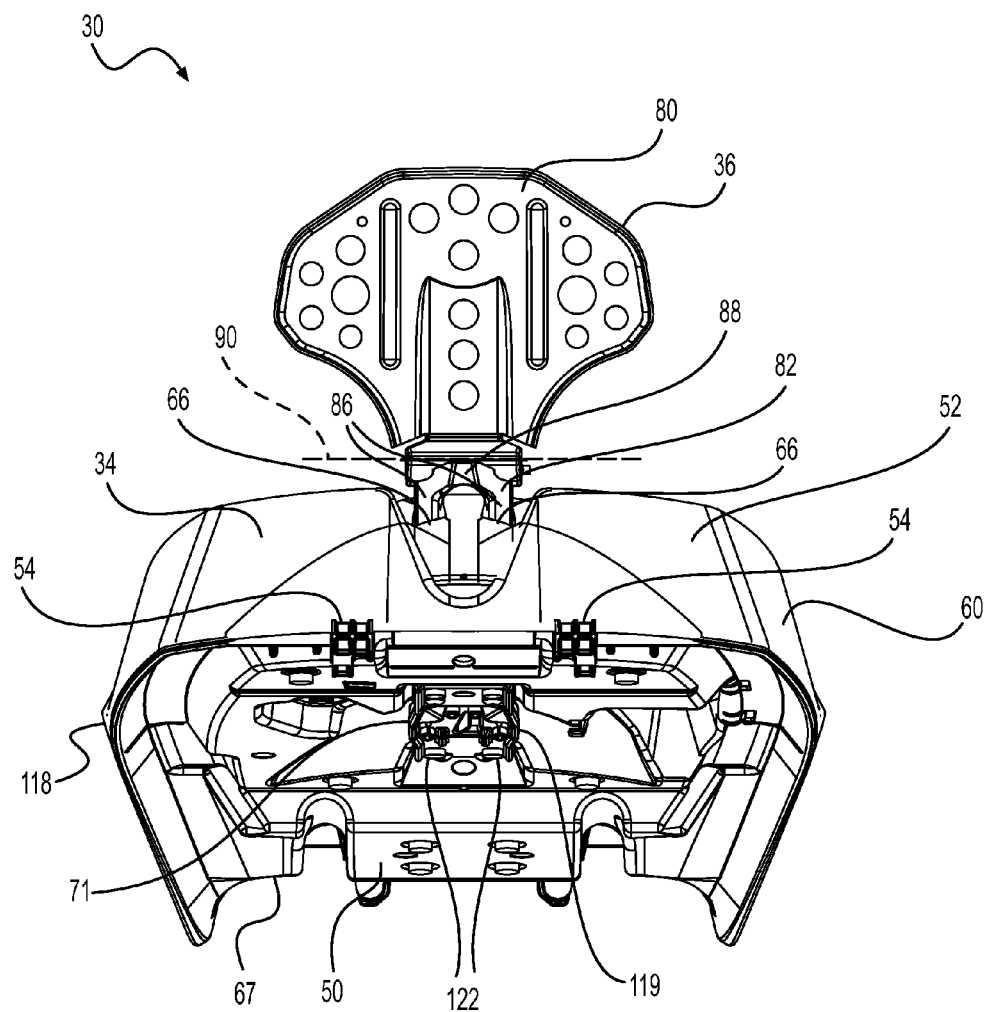
FIG. 3B is a rear elevation view of the seat of FIG. 2A.

With reference to FIG. 1, the vehicle 10 has a front end 5 and a rear end 6 defined consistently with the forward travel direction. A longitudinal centerline 9 extending through the center of the vehicle 10.

The vehicle has left and right front wheels 12, and a rear wheel 14. The front wheels 12 are equally offset from the longitudinal centerline 9, and the rear wheel 14 is aligned with the longitudinal centerline 9. Each of the three wheels 12, 14 has a tire 15. A fairing 16 is disposed over each tire 15 to protect the driver from dirt and water which can be lifted by the tire 15 while it is rolling. Although the vehicle 10 of the illustrated embodiment has two front wheels 12 and one rear wheel 14, it is contemplated that the vehicle 10 could also have one front wheel and two rear wheels, or a single front wheel and a single rear wheel.

The front wheels 12 are supported by a front suspension assembly 20. The rear wheel 14 is supported by a rear suspension assembly 22. The front and rear suspension assemblies 20, 22 are secured to a vehicle frame 24. The front suspension assembly 20 includes a pair of suspension support arms (A-arms) 25 and a shock absorber 26 extending from each side of the frame 24 to support the wheels 12. The rear suspension assembly 22 includes a swing arm 27 pivotally connected to the frame 24. An engine (not shown) drives the rear wheel 14 and is secured to the vehicle frame 24. The vehicle frame 24 is a tubular frame assembly is discussed in greater detail in U.S. patent publication No. 2004/0035623A1, published Feb. 26, 2004, the disclosure of which is incorporated specifically herein by reference. It is contemplated that other types of vehicle frames and front and rear suspensions could be used.

With reference to FIG. 1, the vehicle 10 has a straddle-type seat 30 disposed along the longitudinal centerline 9. The seat 30 has a front seat portion 32 for accommodating a driver, and a back seat portion 34 for accommodating a passenger behind the driver. The back seat portion 34 is higher than the front seat portion 32 to permit the passenger to see in front of the vehicle 10 over the driver. It is contemplated that the straddle-type seat 30 could have only the first portion 32. A driver backrest 36 is provided between the front seat portion 32 and the back seat portion 34. A storage compartment 38 behind the passenger portion 34 of the seat 30 serves as backrest for the passenger. It is contemplated that a backrest similar to the driver backrest 36 could also be disposed behind the passenger portion 34 to serve as a passenger backrest. The seat 30 and the driver backrest 36 will be discussed in further detail below.

A driver foot board 40 is provided on either side of the vehicle 10 below the first portion 32 of the straddle-type seat 30 for a driver to rest his feet thereon. Similarly a passenger foot board 42 is provided on either side of the vehicle 10 below the back seat portion 34 of the straddle-type seat 30 for a passenger to rest his feet thereon.

A steering assembly, including a handlebar 44 connected to a steering column (not shown), is connected to the front wheels 12 for steering the vehicle 10.

The handlebar 44 is disposed forwardly of the straddle-type seat 12 to allow a driver to steer the vehicle 10.

The vehicle 10 has other features and components such as headlights and radiators. As it is believed that these features and components would be readily recognized by one of ordinary skill in the art, further explanation and description of these components will not be provided herein.

Turning now to FIGS. 2 to 11, the seat 30 and the driver backrest 36 will be described.

With reference to FIGS. 2A to 6, the seat 30 has a seat base 50 and a seat cushion 52 disposed on the seat base 50. As mentioned above the seat 30 has a front driver portion 32 and a rear passenger portion 34. The seat base 50 is formed as one integral piece for both the driver portion 32 and the passenger portion 34 of the seat 30, but it is contemplated that the seat base 50 could be formed as two separate pieces. Similarly, the seat cushion 52 is formed as one integral piece for both the driver and passenger portions 32, 34, but it is contemplated that the seat cushion 52 could be formed as separate pieces.

The seat base 50 is made of plastic. The seat base 50 has a bottom surface 67 and an upper surface 68 which engages the seat cushion 52. The front portion 56 of the seat base 50 curves upwards. Wings 58 in the front portion 56 of the seat base 50 curve forwards on the left and right sides to wrap around the frame 24 of the vehicle 10. Flanges 54 at the rear end of the seat base 50 serve to pivotably fix the rear end of the seat base 50 to the frame 24. The seat base 50 is removably fixed at the front end. The seat base 50 can be lifted upwards from the front end to access the vehicle frame 24 underneath the seat 30 as well as the bottom surface 67 of the seat base 50. It is contemplated that the seat base 50 could be removably attached to the vehicle frame 24 by its front end instead of the rear end so that it can be lifted upwards from the vehicle frame 24 by its front end. It is also contemplated that the seat base 50 could be removably attached to the vehicle frame 24 by its front end and rear ends so that the seat base could be removed from the vehicle frame 24.

The seat cushion 52 is made of compressible foam material, molded such that its bottom surface conforms to the shape of the seat base 50. The seat cushion 52 is disposed on the upper surface 68 of the seat base 50. A seat cover 60, placed over the seat cushion 52 and attached to the bottom surface of the seat base 50, serves to fix the seat cushion 52 to the seat base 50. It is contemplated that the seat cushion 52 could be formed integrally with the seat base 50. The waterproof leather cover 60 for the foam helps to prevent the foam from becoming dusty, dirty or wet. It is contemplated that any suitably durable material could be used to cover the seat cushion 52. It is contemplated that the cover 60 could be removable and formed of more than one part. It is also contemplated that the cover 60 could be attached to the seat cushion 52 which could be fastened to the seat base 50.

Figure 10:
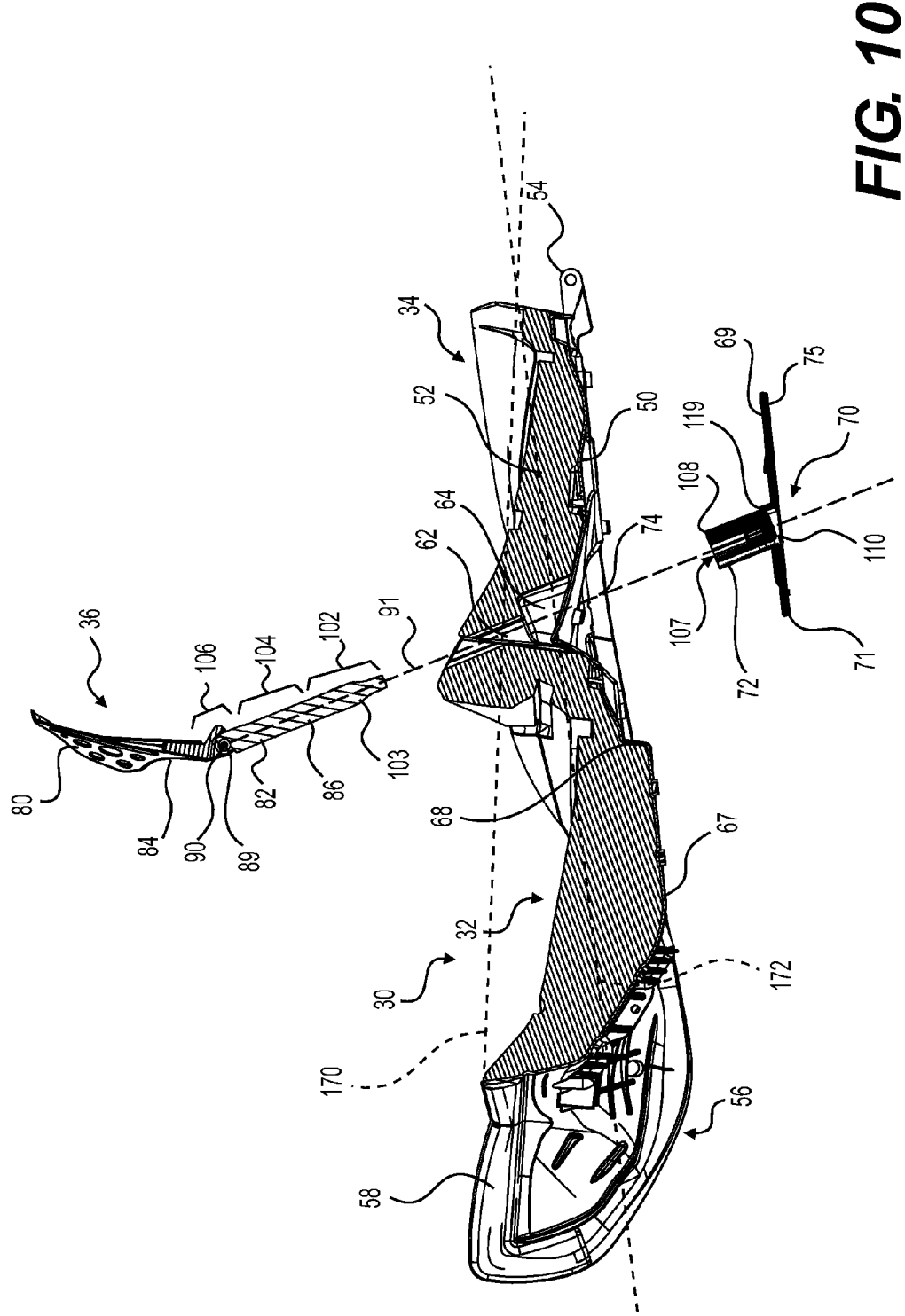
FIG. 10 is an exploded cross-sectional view of the seat of FIG. 2A, taken along the line 10-10 of FIG. 2A.
Figure 11:
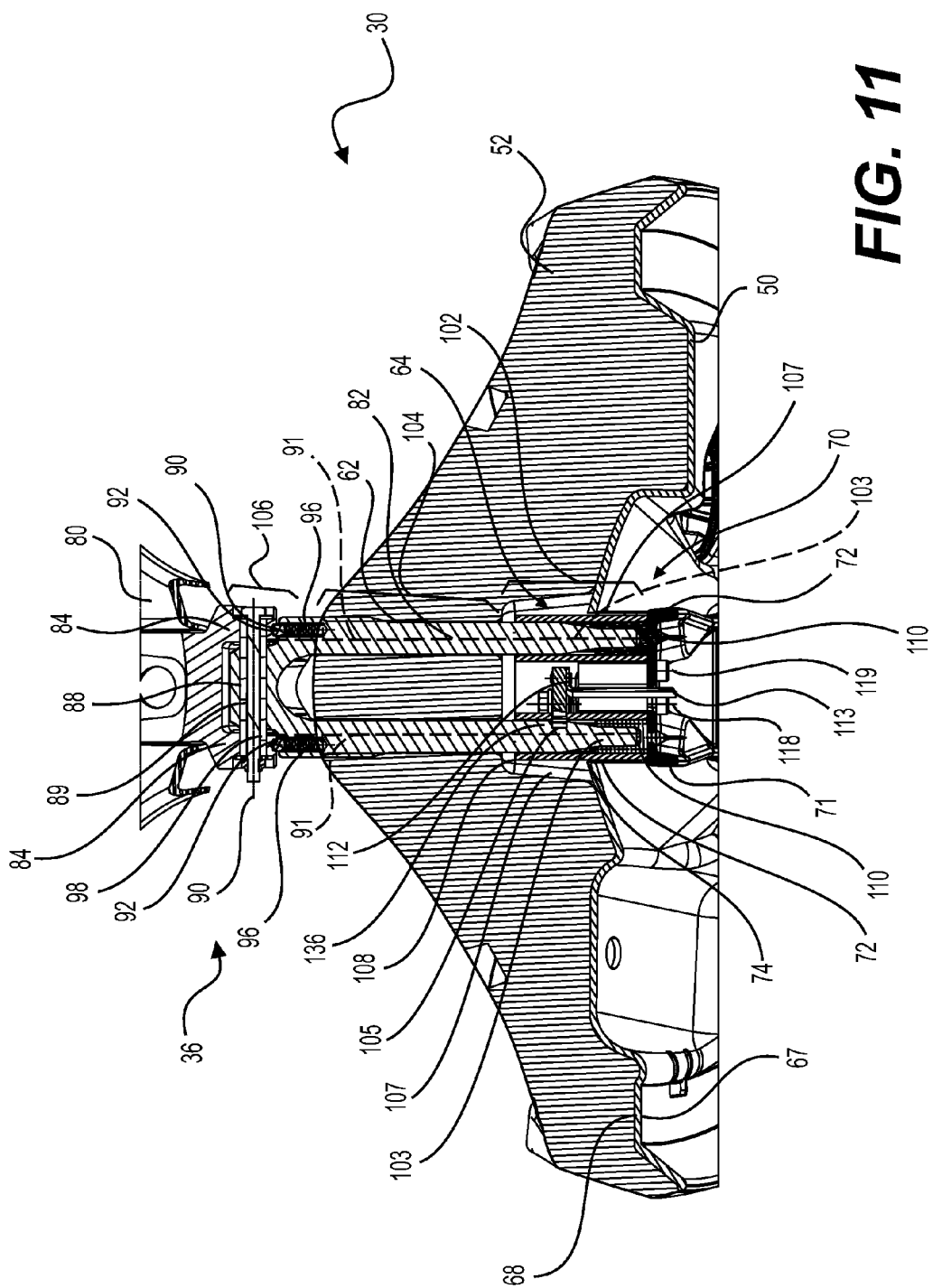
FIG. 11 is a cross-sectional view of the seat of FIG. 2A, taken along the line 11-11 of FIG. 2A.
Figure 12:
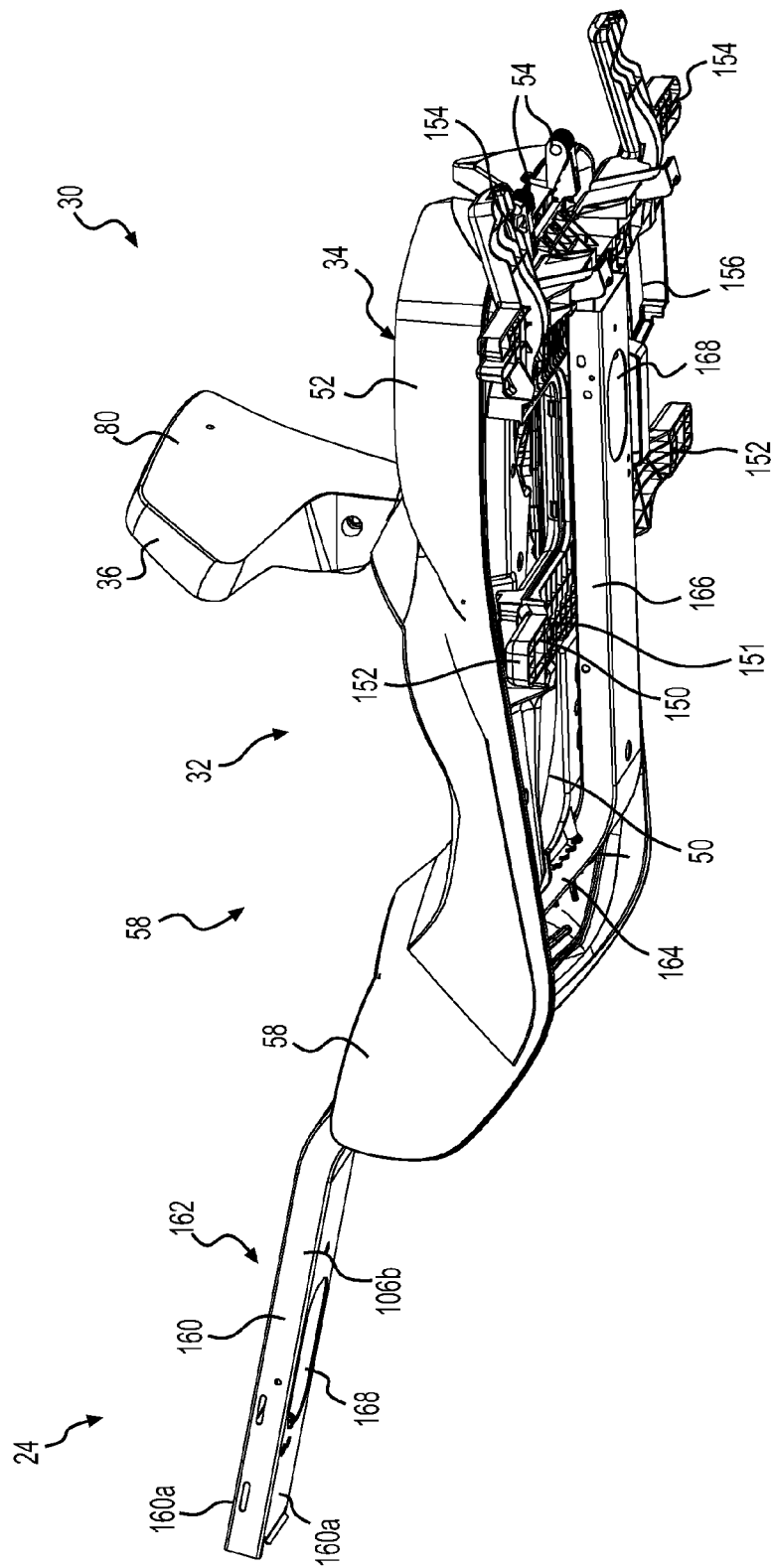
FIG. 12 is a perspective view taken from a bottom, rear and left side, of the seat and a portion of the frame of the vehicle of FIG. 1A with another embodiment of a backrest.
Figure 13:
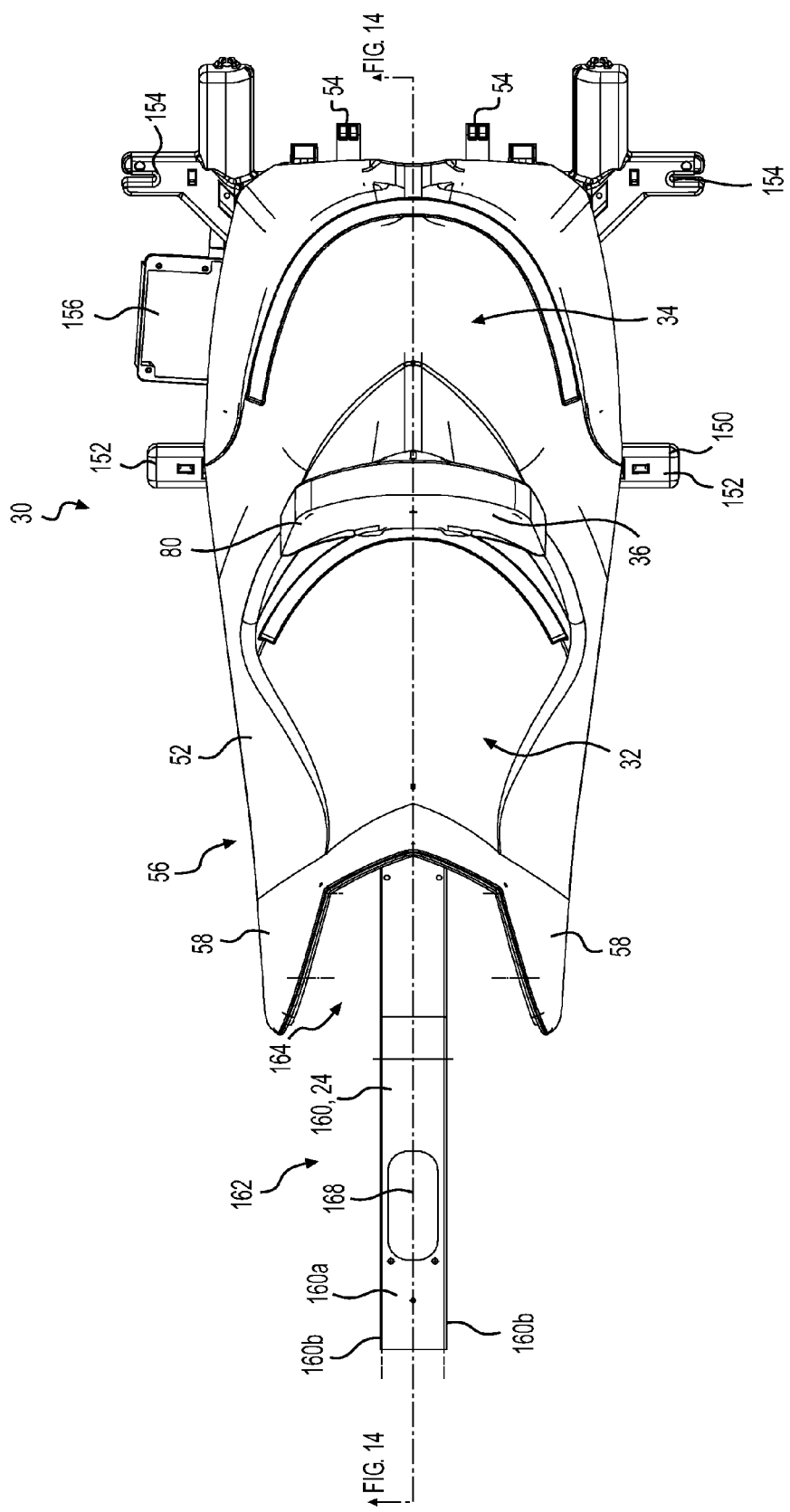
FIG. 13 is a top plan view of the backrest, seat and frame portion of FIG. 12.

As best seen in FIGS. 10 and 11, the seat cushion 52 is provided with a pair of passages 62 extending downward from the top surface and connected to a cavity 64 (best seen in FIGS. 10 and 11) formed in the lower portion of the seat cushion 52 for installation of the backrest 36. The seat base 50 has an opening 74 which is aligned with the seat cushion cavity 64 and seat cushion passages 62. It is contemplated that the seat cushion cavity could be omitted and the seat base passages 62 could extend through the seat cushion 52 to the seat base opening 74.

Figure 5:
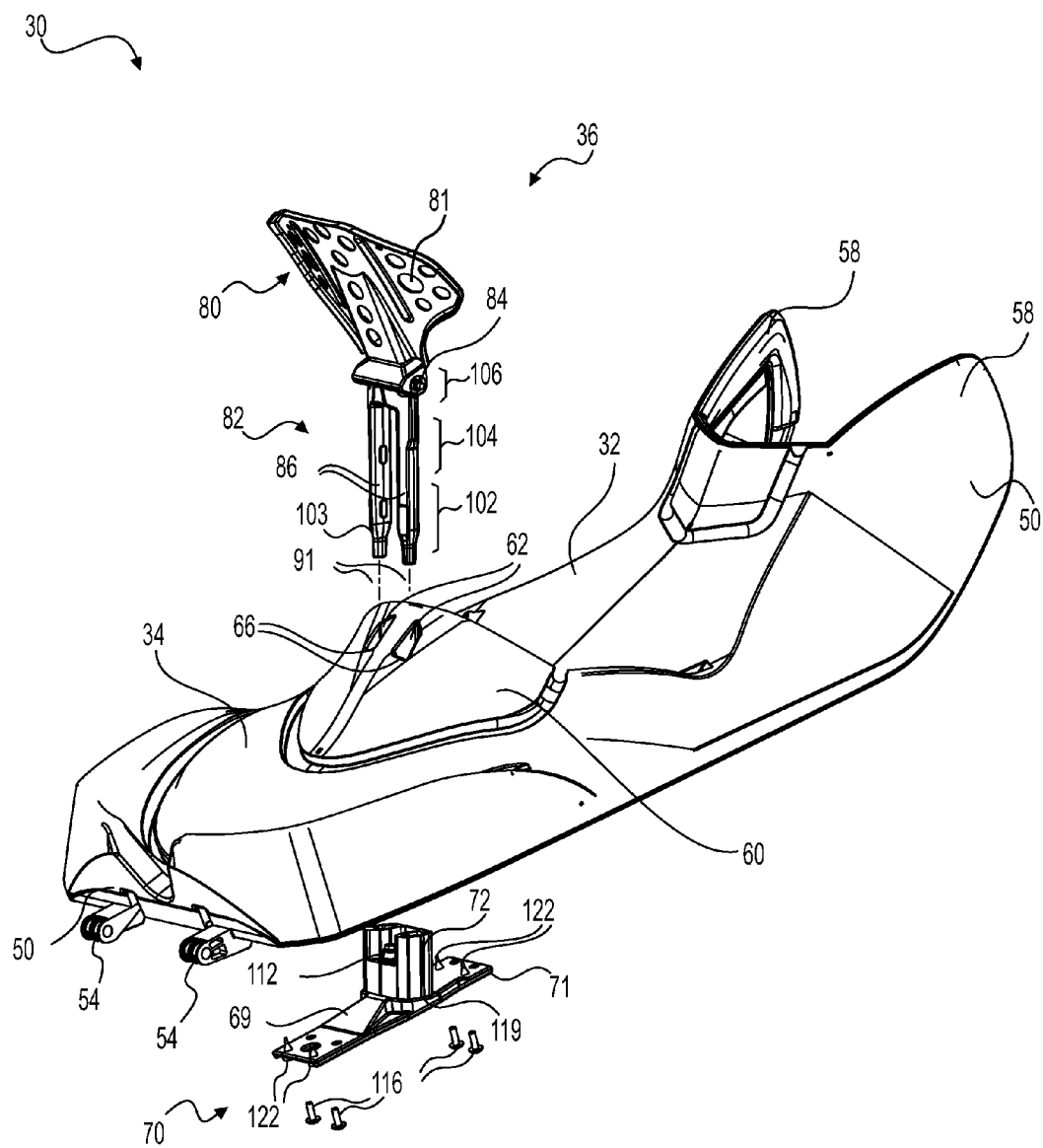
FIG. 5 is an exploded perspective view, taken from a rear, right side, of the seat of FIG. 2A.

As best seen in FIG. 5, the seat cover 60 is provided with a pair of apertures 66 aligned with the passages 62 of the seat cushion 52 to enable installation of the backrest 36. In the illustrated embodiment, the apertures 66 are formed by X-shaped slits 66 made in the cover 60 so that the seat cover 66 extends over the passages 62 of the seat cushion when the backrest 36 is not installed on the seat 30. It is contemplated that the apertures 66 could not be in the form of X-shaped slits. It is contemplated that the seat cover 60 could include aperture covers to cover the apertures 66 when the backrest 36 is not installed on the seat 30. For example, the aperture cover could be in the form a rigid plastic lid friction fit over an aperture 66, or a flexible flap made of the same material as the seat cover 60 and fastened to the seat cover 60 adjacent the aperture 66 by means of a fastener such as a hook and loop fastener and the like.

Figure 4A:
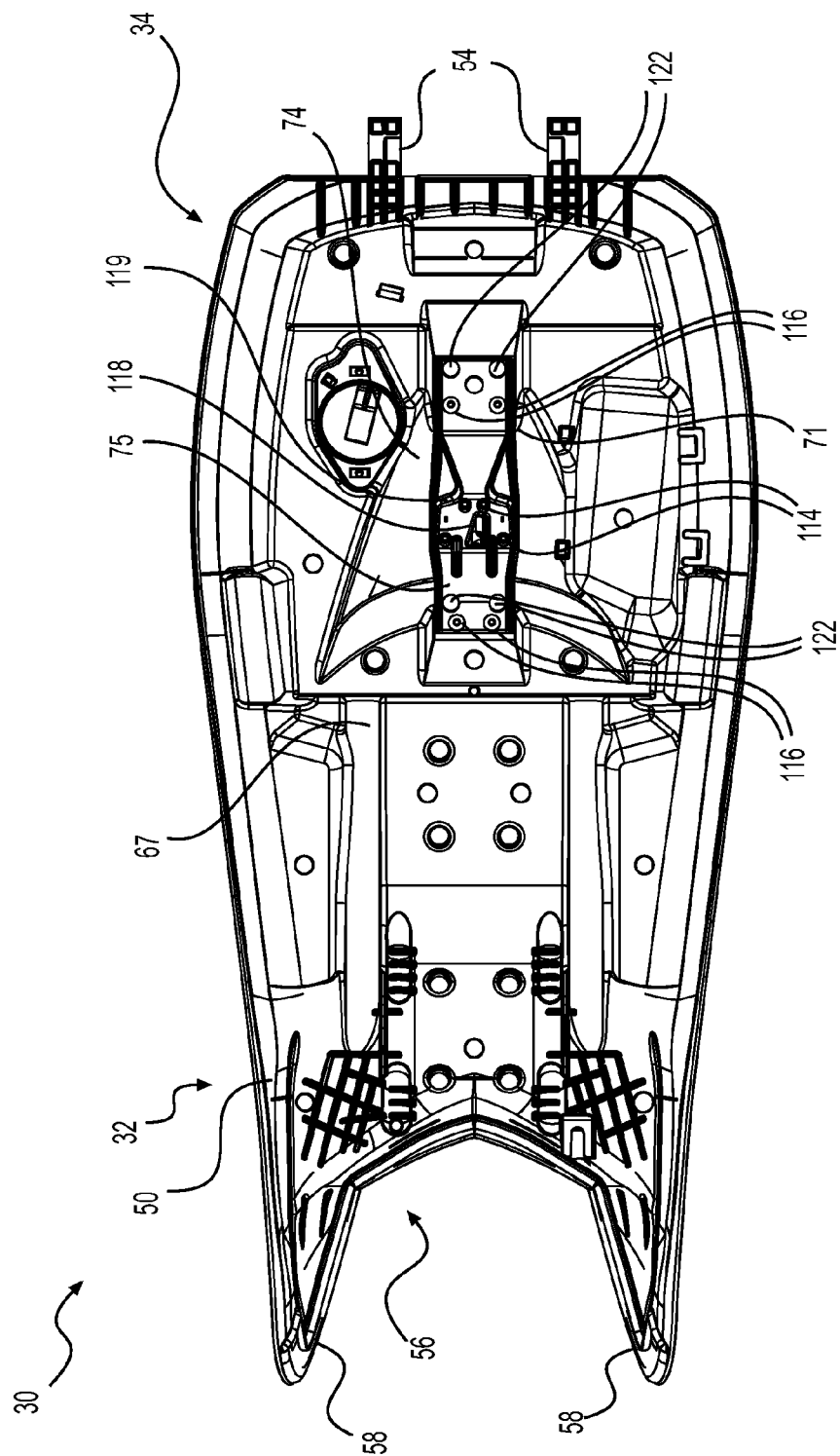
FIG. 4A is a bottom plan view of the seat of FIG. 2A shown with the seat cushion removed for clarity.
Figure 4B:
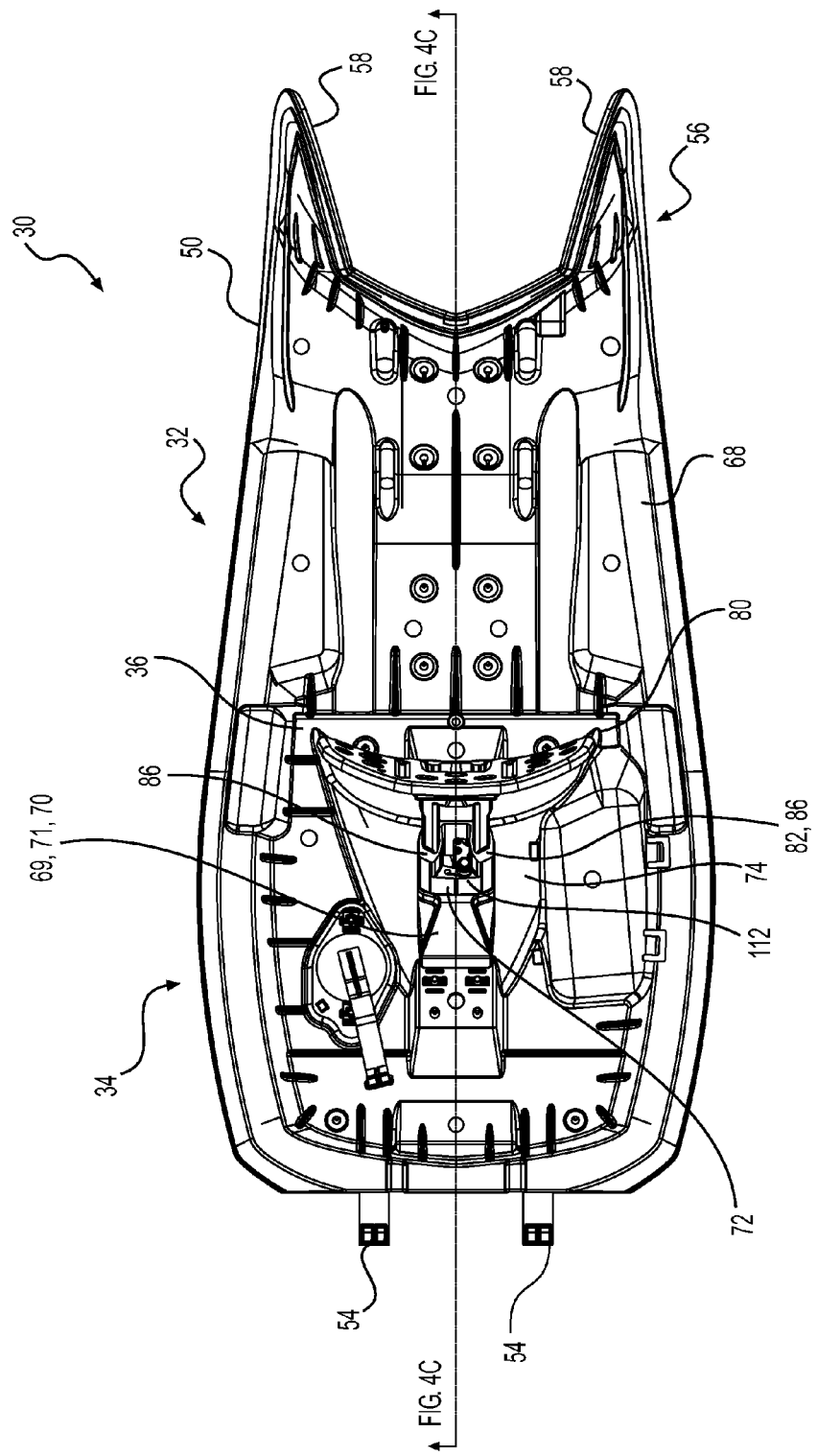
FIG. 4B is a bottom plan view of the seat of FIG. 4A.

With reference to FIGS. 4C and 11, the backrest 36 has a back support portion 80 extending above the seat cushion 52 between the driver portion 32 and the passenger portion 34. The back support portion 80 is pivtoably attached to the seat base 50 by a seat mount 82. The seat mount 82 extends through the passages 62 and cavity 64 of the seat cushion 52 and the opening 74 of the seat base 50. The back support portion 80 is pivotable about a pivot axis 90 so that its angular orientation, with respect to the seat base 50 and the horizontal direction, can be adjusted according to the preference and comfort of the driver and/or passenger.

Figure 6:
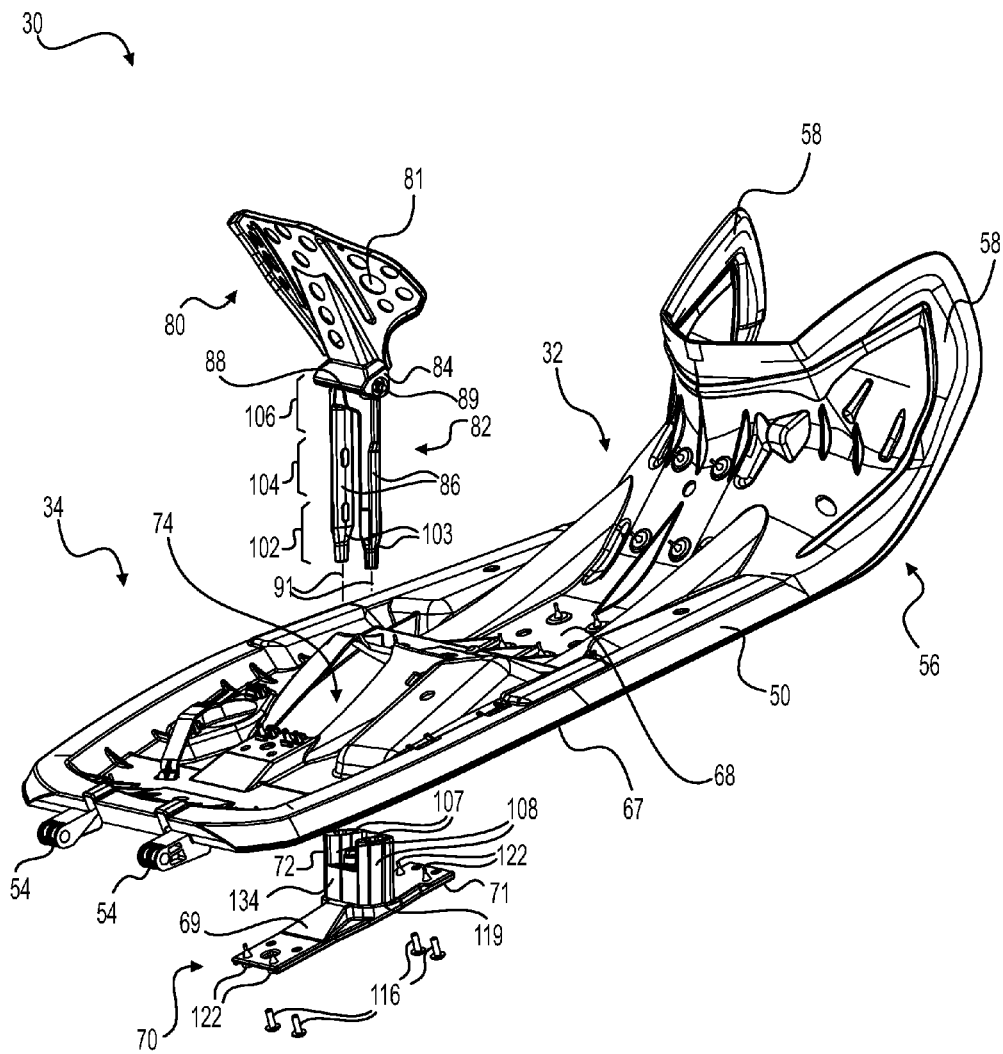
FIG. 6 is an exploded perspective view, taken from a rear, right side, of the seat of FIG. 2A with the seat cushion removed for clarity.

With reference to FIGS. 5 and 6, a mounting assembly 70 removably attaches the seat mount 82 of the backrest 36 to the seat base 50. The mounting assembly 70 includes a mounting plate 71 and an adaptor 72 extending upwards therefrom. The upper surface 69 of the mounting plate 71 is fixed by the bolts 116 to the bottom surface 67 of the seat base 50, adjacent to the seat base opening 74.

Rubber bumpers 122 are inserted through the metal mounting plate 72 to prevent metal to metal contact between the bottom surface 75 (seen clearly in FIG. 8D) of the mounting plate 72 and the vehicle frame 24, and to prevent vibrations of the vehicle frame 24 from being transferred to the driver/passenger if/when the seat base 50 flexes.

With reference to FIGS. 4C, 10 and 11, the adaptor 72 extends through the seat base opening 74 and above the seat base 50 into the cavity 64 of the seat cushion 52. The seat cushion 52 extends above the adaptor 72, with sufficient thickness of foam material between the adaptor 72 and the outer surface of the seat cushion 52, so that a passenger sitting in the rear portion 34 or a driver sitting in the front portion 32 of the seat 30 will not feel the adaptor 72 when the backrest 36 is not installed on the seat 30. The adaptor 72 is disposed below a line 170 (shown as a dashed line in FIG. 10) passing through the highest points of the front and rear ends of the seat cushion 52 and disposed in a vertical plane containing the longitudinal centerline 9. A line 172 (shown as a dashed line in FIG. 10) passing through the lowest points of the front and rear ends of the seat cushion 52 and disposed in a vertical plane containing the longitudinal centerline 9 passes through the adaptor 72. It is contemplated that the adaptor 72 could extend above the seat cushion 52.

With reference now to FIGS. 7 to 11, the backrest 36 will be described in detail.

As mentioned above, the backrest 36 includes the back support portion 80, configured to support the driver's back, and the seat mount 82 that attaches the backrest 36 to the seat base 50. The back support portion 80 is pivotably attached to the seat mount 82.

The back support portion 80 has a plastic frame with a compressible foam material molded onto the plastic frame. It is contemplated that the back support portion 80 could extend higher or lower than as shown in the illustrated embodiment. It is contemplated that the foam could be omitted from the back support portion 80. The back support portion 80 is concave towards the front for supporting the driver's back. The back support portion 80 is curved forwardly in the upper portion, as well as the lateral sides. It is contemplated that the back support portion 80 could not be curved. The back support portion 80 has a plurality of apertures 81 which aid air circulation and enhance the driver's comfort during long rides. It is contemplated that the number, shape, size and arrangement of the air circulation apertures could be different. It is also contemplated that the apertures could be omitted. A pair of connection flanges 84 is provided at the lower end of the back support portion 80 for connecting to the seat mount 82.

The forked seat mount 82 comprises two vertical metal posts 86 connected by a horizontal connection member 88. The connection member 88 is in the form of a tube which is open at both ends.

The posts 86 have a rectangular cross-section. It is contemplated that the cross-section of the posts could be other than rectangular. The central axes 91 of the posts 86 extend perpendicularly to the tube 88. The tube 88 is placed between the two connection flanges 84 so that the openings of the connection flanges 84 are aligned with the tube 88. The back support portion 80 and the vertical posts 86 extend in opposite directions from the tube 88.

The back support portion 80 and the seat mount 82 are pivotably connected together by a bolt 89 inserted through the openings of the connection flanges 84 and the tube 88. The bolt 89 in the tube 88 defines the pivot axis 90 for the back support portion 80. The back support portion 80 pivots forward and rearward about the bolt 89 thereby changing the angular orientation of the back support portion 80 with respect to the seat mount posts 86, and the seat base 50.

Each connection flange 84 on either side of the tube 88 is supported on top of the corresponding vertical posts 86 of that side. A ball bearing 92 is placed between the connection flange 84 and the vertical post 86 of each side. Each vertical post 86 has a passage 94 extending downwards from its upper surface. A spring 96 (FIG. 11) placed in the passage 94 biases the ball bearing 92 against the surface of the connection flange 84.

Figure 7:
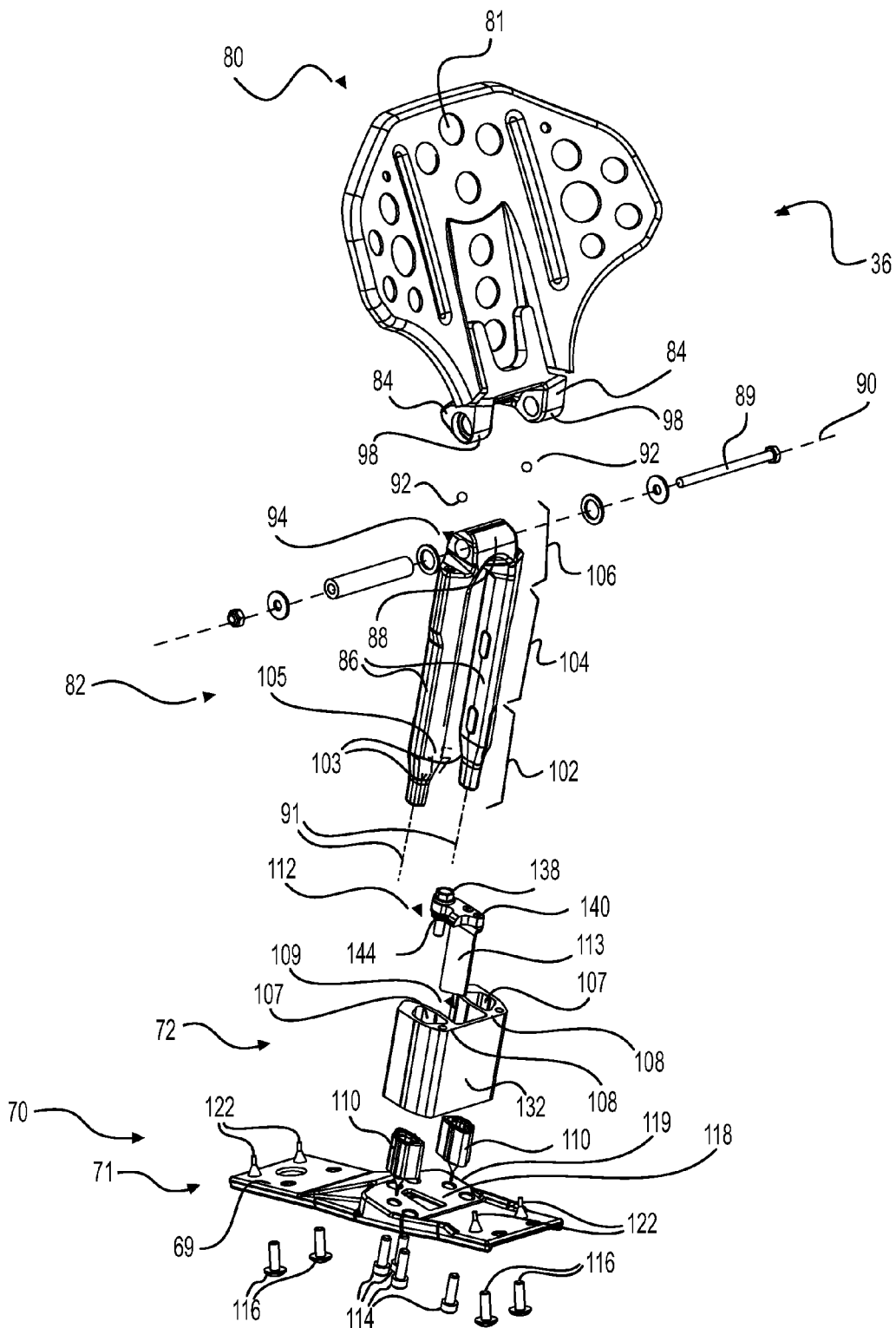
FIG. 7 is an exploded perspective view, taken from a front, right side, of a backrest and mounting assembly of the seat of FIG. 2A.

With reference to FIGS. 7 and 11, the outer surface of each connection flange 84 has a plurality of grooves 98 extending horizontally (parallel to the pivot axis 90). The ball bearing 92 is retained in a groove 98 by the spring 96 biasing the ball bearing 92 against the surface of the groove 98. The ball bearing 92 can be moved from a first groove 98 to a second groove 98 by pushing the back support portion 82 against the seat mount 82, so that the ball bearing 92 and spring 96 retract into the passage 94, allowing the connection flange 84 to rotate about the pivot axis 90 until the first groove 98 slides past the passage 94. When the second groove 98 is aligned with the passage 94 and pressure on the back support portion 80 against the seat mount 82 is released, the ball bearing 92 is retained in the second groove 98. The ball bearing 92 held between one of the flange grooves 98 and the spring 96 in the passage 94 thus serves to lock the back support portion 80 at a particular angle with respect to the seat mount 82. Each groove 98 of the connection flange 84 thus corresponds to a different angular configuration of the backrest 36.

As mentioned above the seat mount 82 attaches the backrest 36 to the seat base 50 via the mounting assembly 70. The posts 86 of the seat mount 82 are inserted through the seat cover apertures 66, the seat cushion passages 62 and into the adaptor 72 of the mounting assembly 70 as shown in FIG. 10. With reference to FIG. 11, a lower portion 102 of each post 86 is received in the adaptor 72 of the mounting assembly 70. A middle portion of each post 86, adjacent to the lower portion 102, is disposed in the passage 62 of the seat cushion 52 when the lower portion is disposed in the adaptor 72. An upper portion 106, which includes the connection tube 88 and referred to as the connection portion 106, remains outside the seat cushion 52 when the lower portion 102 of the posts 86 are disposed in the adaptor 72.

In the lower portion 102, the posts 86 have an angled surface 103. The angled surface 103 of the post 86 is angled away from the receptacle wall towards the central axis 91 of the post 86. The cross-section of the posts 86 is narrower in the lower portion 102 having the angled surface 103 and therebelow.

A notch 105 is also defined in the lower portion 102 of the right side post 86 just above its angled surface 103. The notch 105, rectangular in shape, is defined in the surface of the right side post 86 facing the left side post 86. It is contemplated that the notch could be in the form of a hole extending through the post 86.

With reference to FIGS. 7 to 9D, the mounting assembly 70 for the backrest 36, will now be described. The mounting assembly 70 includes the mounting plate 71, the adaptor 72 and a lock 112.

The mounting plate 71 is generally flat with a raised section 119 defining a wedge-shaped slot 118. The bottom surface 75 (FIGS. 8D and 9A) of the mounting plate 71 is spaced from the vehicle frame 24 in the raised section 112. The adaptor 72 is disposed on the upper surface 69 of the mounting plate 71 on the raised section 119, and fastened thereto by bolts 114.

Figure 8A:
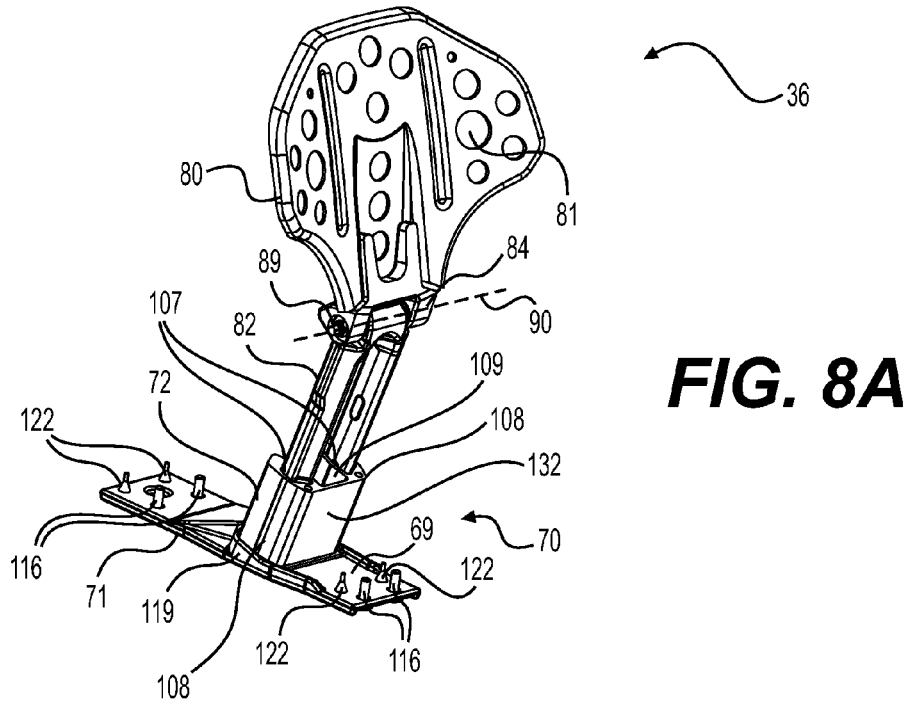
FIG. 8A is perspective view, taken from a front, right side, of the backrest and mounting assembly of FIG. 7 as assembled.
Figure 8B:
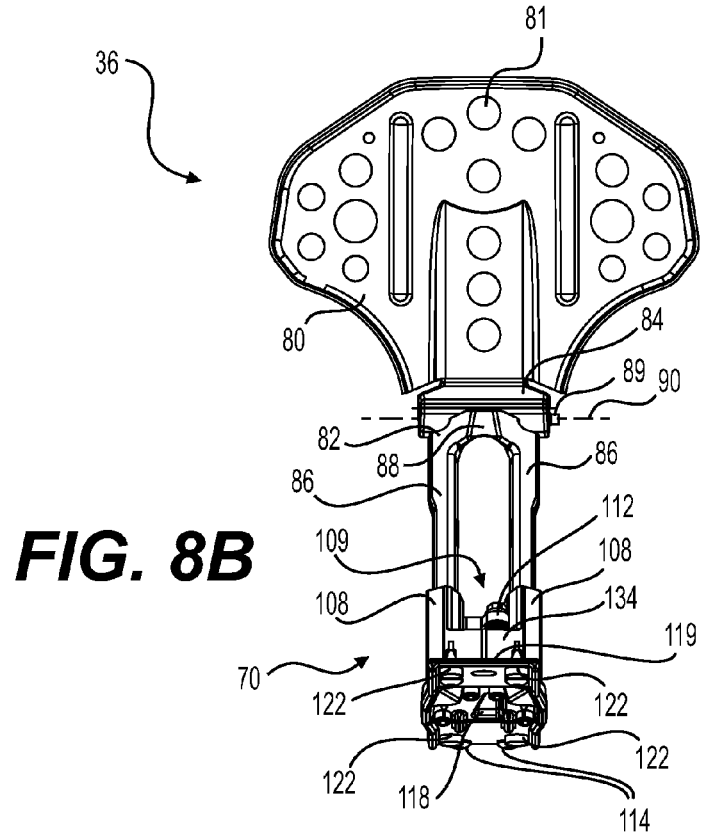
Figure 9A:
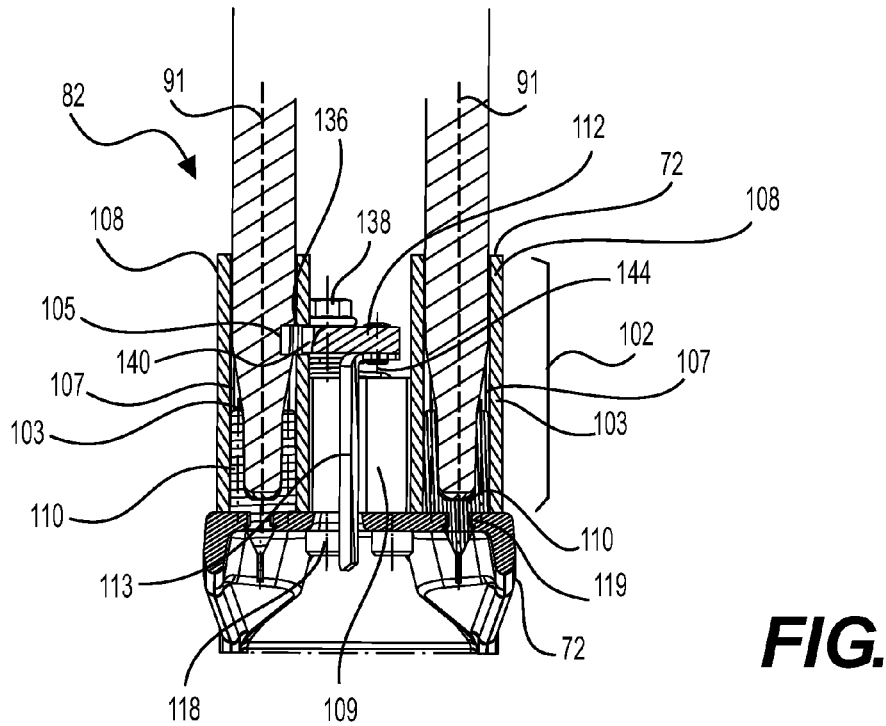
FIGS. 9A and 9B are cross-sectional views of a portion of the backrest and mounting assembly of FIG. 8A, taken along the line 9A-9A of FIG. 8C, respectively showing a lock disposed in an open and closed position.
Figure 9B:
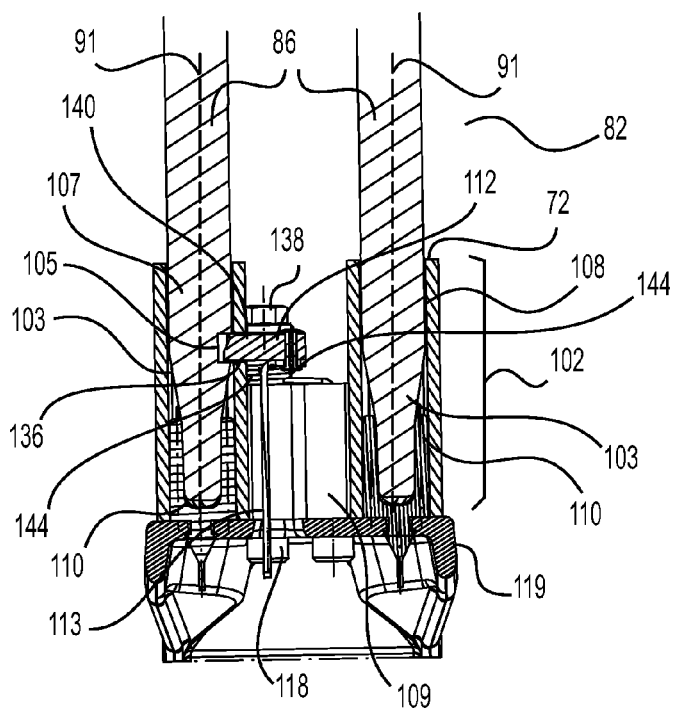
Figure 9C:
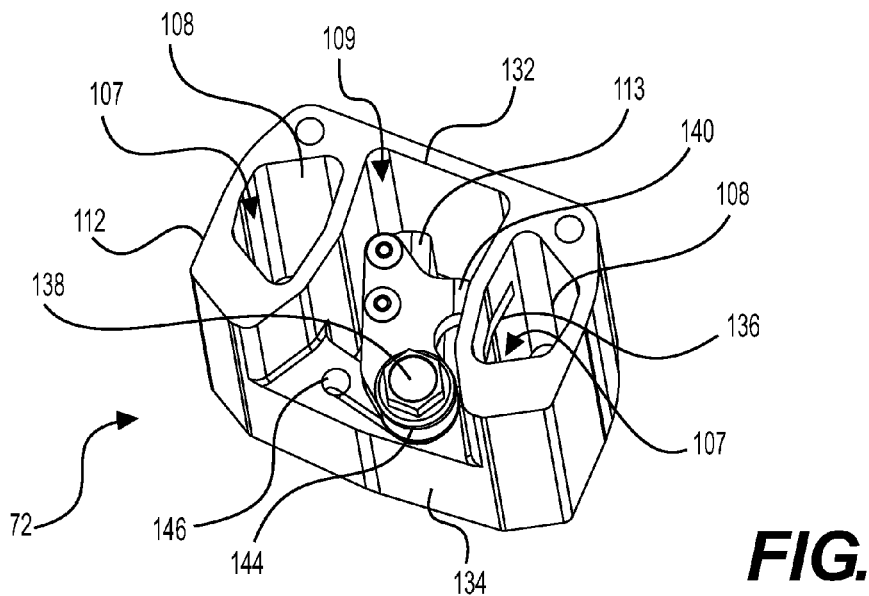
FIGS. 9C and 9D are perspective views, taken from a rear, right side, of an adaptor of the mounting assembly of FIG. 8A, respectively shown with the lock disposed in an open and closed position.
Figure 9D:
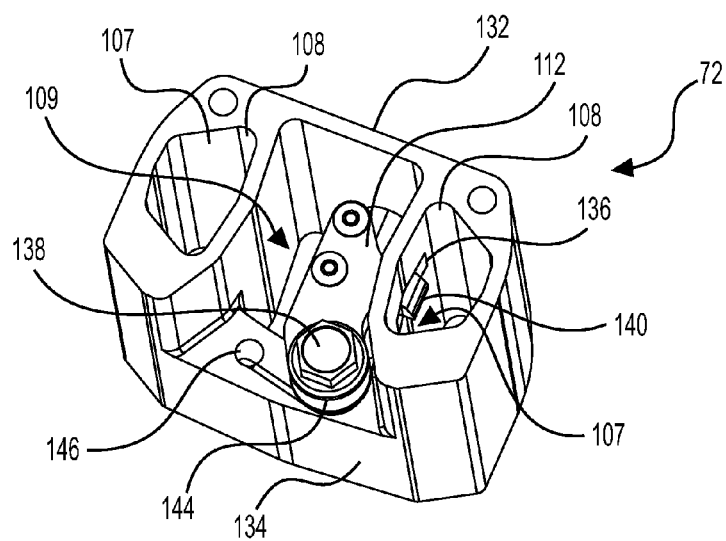

The adaptor 72 includes two receptacles 108, each having a passage 107 defined therein to receive the lower portion 102 of the post 86. The raised section 119 of the mounting plate 71 is sloped downwards towards the front so that the posts 86 incline forward with respect to the seat base 50 as best seen in FIG. 8C. It is contemplated that the raised section could not be angled with respect to the seat base 50. It is also contemplated that the posts 86 could be disposed perpendicular to the seat base 50.

The posts 86 are retained in the receptacles 108 of the adaptor 72 by a lock 112. The lock 112 is disposed in a gap 109 extending between the receptacles 108. As will be explained below, the lock 112 is a quick-release type of lock that can be operated without the use of any tools.

With reference to FIGS. 7 and 9A to 9D, the receptacles 108 of the adaptor 72 are formed as hollow tubular structures open at both ends, i.e. the receptacles are open at the upper surface and the bottom surfaces of the adaptor 72. The tubular passages 107, in which the posts 86 are received, are generally trapezoidal in shape. It is contemplated that the cross-sectional shapes of the posts 86 and the passages 107 could be other than rectangular and trapezoidal. For example, the posts 86 and passages 107 could be circular in cross-section.

The adaptor 72 has a front wall 132 and a rear wall 134, each extending between the receptacles 108. The gap 109 extends between the walls 132, 134 and the receptacles 108. The front wall 132 extends between the top and bottom surfaces of the receptacles 108. The rear wall 134 also extends upwards from the bottom surface but only part of the way to the upper surface of the adaptor 72. The right receptacle 108 has a slot 136 extending into its tubular passage 107 from the gap 109. It is contemplated that the gap 109 could be disposed adjacent to the one receptacle 108 which has the slot 136.

The lock 112 is rotatably attached to the upper surface of the rear wall 134 by a bolt 138. The lock 112 includes a push-plate 113 and a lock member 140 biased to extend into the slot 136 to engage the right post 86 disposed in the right receptacle 108. The lock 112, and thus the push-plate 113 and the member 140, rotate about the bolt 138.

The lock member 140 is in the form of a tab 140. The height of the rear wall 134 is adapted to align the tab 140 with the slot 136. The slot 136 is rectangular, and the tab 140 is generally rectangular in a vertical cross-section with a rounded top edge. It is contemplated that the slot 136 and the tab 140 could have a vertical cross-section that is other than rectangular in shape, for example, circular, elliptical and the like. The top edge of the tab 140 is rounded (curved downwards) to facilitate insertion of the post 86 into the receptacle.

The push-plate 113 (best seen in FIG. 7) is rigidly connected to the tab 140. The push-plate 113 extends downwards through the gap 109, through the slot 118 into the space between the raised section 119 and the vehicle frame 24. The wedge-shape of the slot 118 limits rotation about the bolt 138 of the push-plate 113 extending therein. The raised portion 119 of the mounting plate 71 ensures that the bottom end of the push-plate 113 is not in contact with the vehicle frame 24.

A torsional spring 144 biases the tab 140 to extend into the slot 136 of the receptacle 108. The helical section of the torsional spring 144 is inserted around the bolt 138 between the lock 112 and the rear wall 134. One end of the helical coil is inserted into a hole 146 on the upper surface of the rear wall 134 while the other end is inserted into a portion integral with the tab 140 to bias the tab 140 towards the receptacle 108.

Rubber spacers 110 are placed within the passages 107 of the receptacles 108 to receive the end portion of the metal posts 86. The rubber spacers 110 surround the portion of the posts 86 with the narrower cross-section, thereby minimizing play between the posts 86 and the receptacles 108. The rubber spacers 110 prevent metal to metal contact between the ends of the metal post 86 and the metal mounting plate 71.

During installation of the backrest 36 in the seat 30, as the post 86 is pushed into the receptacle 108 past the slot 136, the angled surface 103 of the right post 86 sliding past the rounded top edge of the tab 140, exerts a force on the biased tab 140 towards the slot 136. As mentioned above, the right post 86 has a notch 105 above the angled surface 103. The notch 105 is defined in the surface facing the slot 136. As the post 86 slides downward into the receptacle 108, the notch 105 slides into alignment with the slot 136. The biased tab 140 snaps into the aligned slot 136 and notch 105, preventing further upwards movement of the post 86 in the receptacle 108, and thereby locking the post 86 in the receptacle 108. The rubber spacers 110 also provide a small biasing force pushing the post 86 toward the lock 112.

In order to unlock the posts 86 from the adaptor 72, and to remove the backrest 36 from the seat 30, the push-plate 113 is rotated about the bolt 138 in a direction away from the receptacle 108 until the tab 140 slides out of the slot 136.

The push-plate 113 is rotated by accessing its bottom end by raising the front portion 56 of the seat base 50 from the vehicle 10.

The lock 112 can therefore be operated, both for locking and unlocking the posts 86 in the receptacles 108, without having to disassemble the mounting assembly 70 or the seat 30.

It is contemplated that the angled surface 103 could be provided on the post 86 only on the side facing the slot 136. It is contemplated that the shapes of the notch 105, the slot 136 could be other than rectangular, such as, for example, circular. It is contemplated that the member 140 could be in the form of a pin, a hook or other such structure. It is contemplated that the member 140 could extend into the receptacle 108 at an angle with respect to the receptacle wall and/or the central axis 91 of the post 86.

It is contemplated that both receptacles 108 could have a slot 136. It is contemplated that each of the posts 86 of the forked seat mount 82 could be locked in the respective receptacles 108 by respective locks 112. A gap 109 could be defined adjacent to each of the receptacle 108 for housing their respective locks 112. It is also contemplated that the lock 112 could have two members 140, each member 140 extending into a slot 136 of one of the receptacles 108. The complementary slots 136 and members 140 could be configured to enable insertion and removal of the members 140 into/out of the slots 136 by rotation of the lock 112 about an axis centered between the two members 140.

It is contemplated that the lock 112 could be disposed other than between the receptacles 108. For example, the lock 112 could be disposed in front of one of the receptacles 108 with the slot 136 extending in the front wall of the receptacle 108.

It is contemplated that the number of posts 86 and the corresponding number of receptacles 108 in the adaptor could be one or more than two. It is contemplated that the gap 109 could be omitted. It is contemplated that a plurality of posts 86 could be received in one receptacle 108. The adaptor 72 is made of extruded steel. The mounting plate 71 is also made of steel. It is however also contemplated that the mounting plate 71 and the adaptor 72 could be made of other suitable materials using any suitable method. It is contemplated that the adaptor 72 and mounting plate 71 of the mounting assembly 70 could be integrally formed. It is also contemplated that the mounting assembly 70 could be integrally formed with the seat base 50.

It is contemplated that a backrest kit could be provided for assembly of the backrest 36 onto the seat 30. The kit would include the back support portion 80, the seat mount 82 and the mounting assembly 70. The kit could also include the seat cover 60.

With reference to FIGS. 12 to 20, the seat 30 and backrest 36 are supported by a vehicle frame 24 which includes a seat support member 160 and a frame spacer 150. The seat 30 and the backrest 36 of FIGS. 12 to 20 are similar to the seat 30 and backrest 36 described above and shown in the previous Figures. As such, the components of the seat 30 and backrest 36 have been labelled with the same reference labels and will not be described again in detail below except in relation to the vehicle frame 24.

The seat support member 160 extends longitudinally below the seat 30. The rear end of the seat support member 160 is connected to another portion of the vehicle frame 24. The front end of the seat support member 160 is also connected to another portion of the vehicle frame 24. The support member is made of metal. The seat support member 160 is tubular and has a rectangular lateral cross-section. The tubular seat support member 160 is formed by a horizontally extending upper portion 160a, a horizontally extending lower portion 160a, a right side portion 160b extending vertically from the right edge of the upper portion 160a to the right edge of the lower portion 160a, and a left side portion 160b extending vertically from the left edge of the upper portion 160a to the left edge of the lower portion 160a. The seat support member 160 is laterally narrower than the seat base 50 and the seat cushion 52. The upper and lower portions 160a include openings 168 for reducing the weight of the vehicle frame 24.

The seat support member 160 has a horizontally extending front portion 162, a middle portion 164 extending rearwardly and downwardly from the front portion 162, and a rear portion 166 extending rearwardly and upwardly from the middle portion 164. The rear portion 166 supports the backrest 36, the mounting plate plate 71, a rear portion of the front seat 32, and a front portion of the rear seat 34. The wings 58 of the front portion 56 of the seat base 50 extend on either side of the middle portion 164 of the seat support member 160. The front portion 162 is disposed forwardly of the wings 56 and vertically higher than the wings 56. The seat base 50 extends rearwardly of the rear end of the seat support member 160. It is contemplated that the seat support member 160 could extend rearwardly of the seat base 50.

It is contemplated that the portions 162, 164, 166 could be angled differently than as shown. It is contemplated that one or more of the portions 162, 164, 166 could be curved. It is also contemplated the seat support member 160 could extend horizontally through its entire length.

Figure 18:
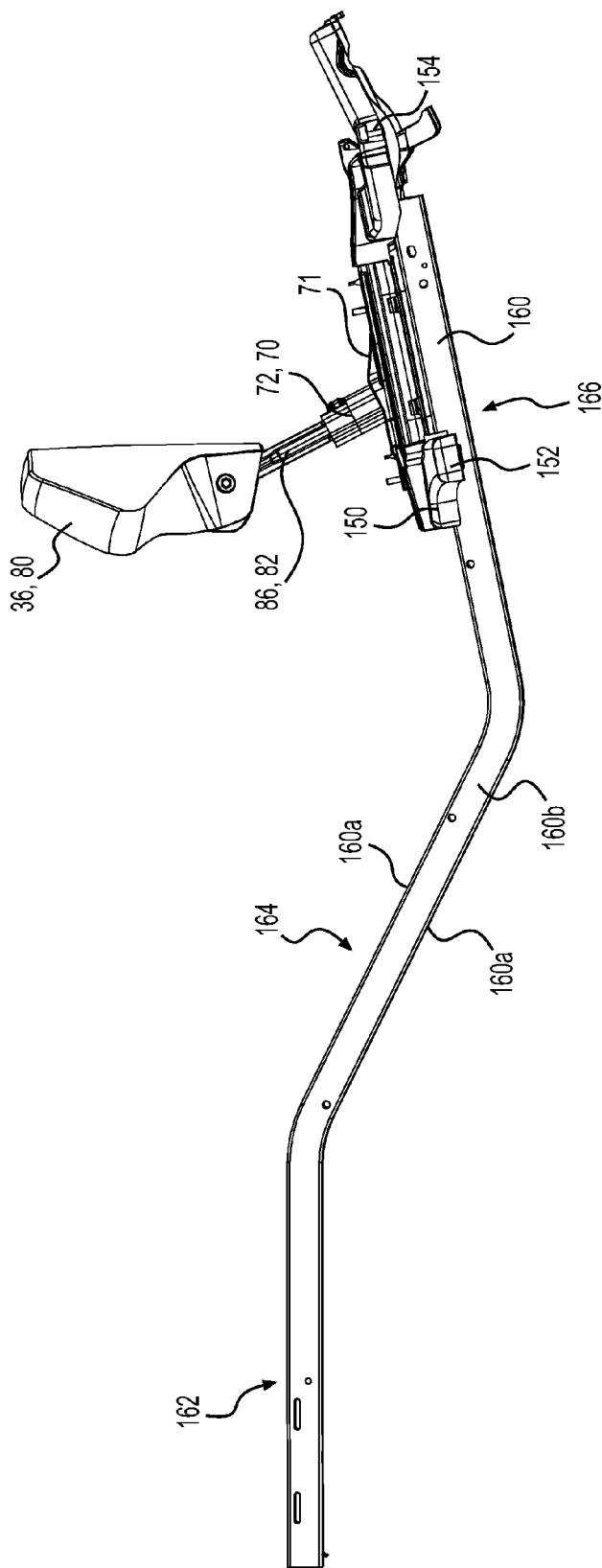
FIG. 18 is a left side elevation view of the backrest, adaptor, mounting plate, frame spacer and frame portion of FIG. 15.
Figure 19:
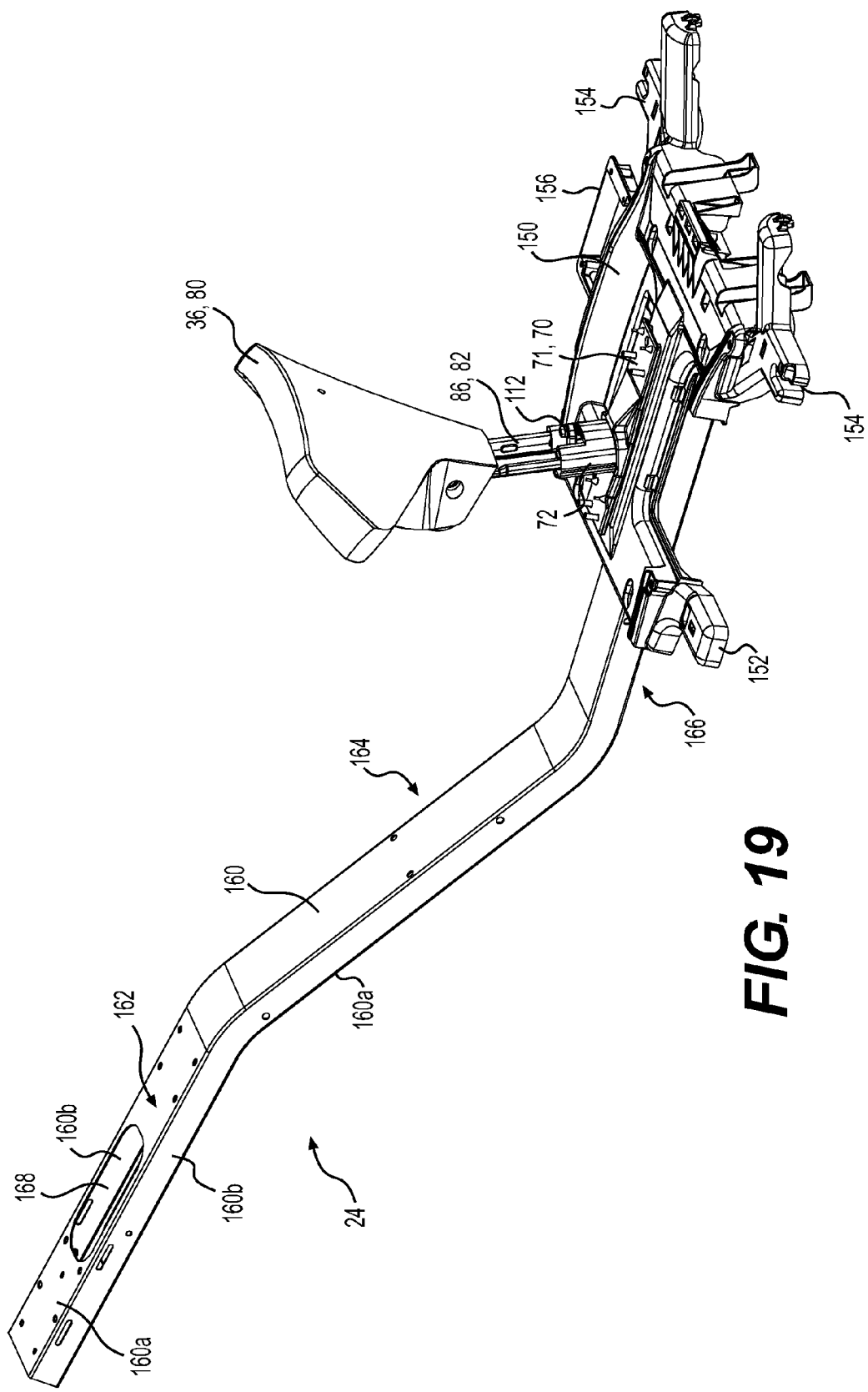
FIG. 19 is a perspective view, taken from a top, rear and left side of the backrest, adaptor, mounting plate, frame spacer and frame portion of FIG. 18.
Figure 20:
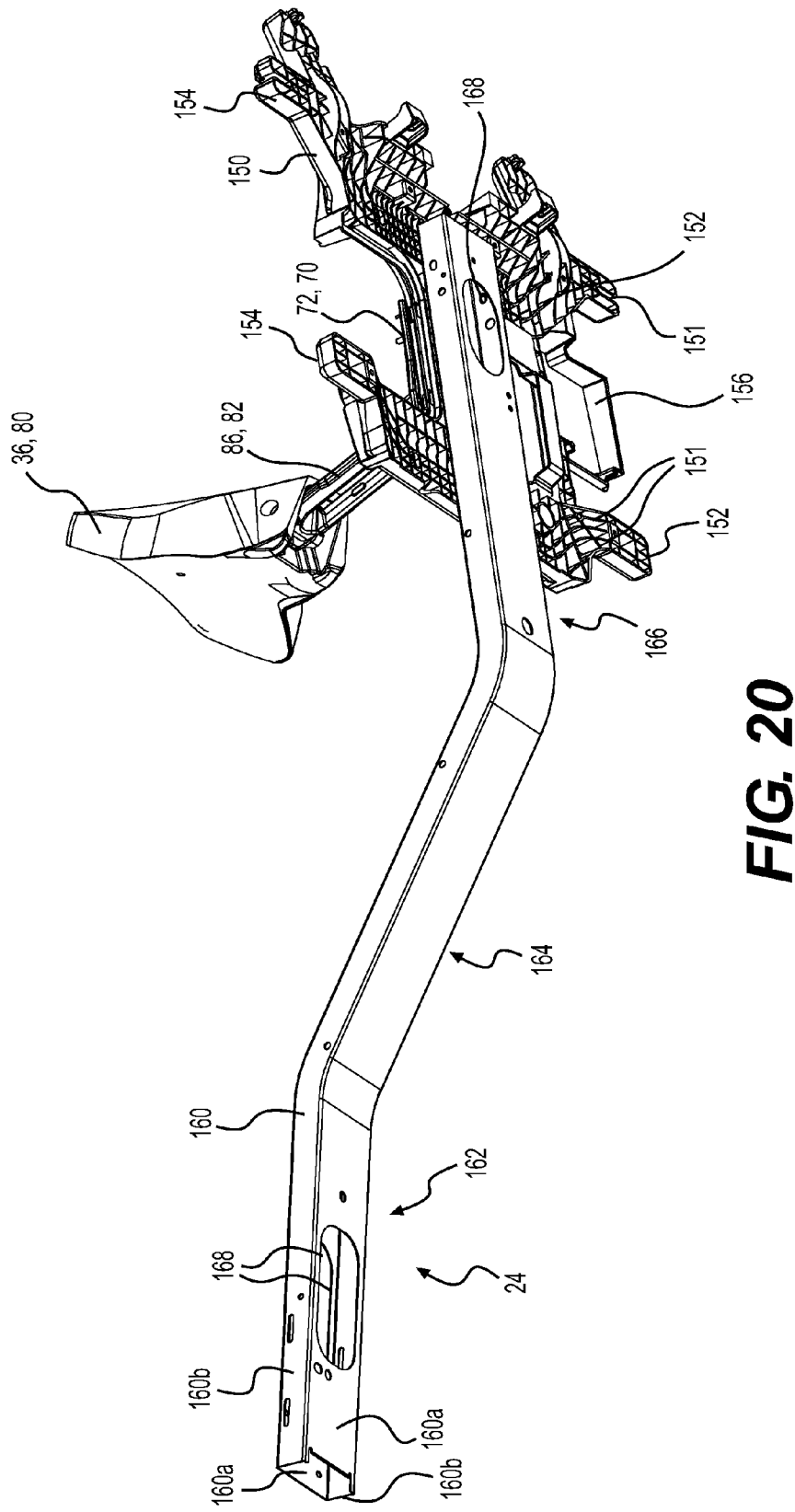
FIG. 20 is a perspective view, taken from a bottom, front and left side of the backrest, adaptor, mounting plate, frame spacer and frame portion of FIG. 18.

With reference to FIGS. 18 to 20, a frame spacer 150 is disposed on the rear portion 166 of the seat support member 160. The frame spacer 150 is rigid and made of molded plastic. The frame spacer 150 rests on the rear portion 166 of the seat support member 160. The upper surface of the frame spacer 150 contacts the bottom surface 67 of the seat base 50. The mounting plate 71 attached to the bottom surface 67 of the seat base 50 is disposed on the frame spacer 150. The frame spacer 150 prevents direct contact between the metal mounting plate 71 and the metal support member 160.

The frame spacer 150 has a generally rectangular central portion with an upper surface and a bottom surface. The mounting plate 71 and the seat base, contact the upper surface. The bottom surface has reinforcement ribs 151 projecting downwardly therefrom.

The frame spacer 150 has a front right bracket 152, a front left bracket 152, a rear right bracket 154 and a rear left bracket 154 projecting outwards from the central portion. The left brackets 152, 154 extend leftwardly from the central portion, past the left portion 160b of the seat support member 160 and the left edge of the seat 30. The right brackets 152, 154 extend rightwardly from the central portion, past the right portion 160b of the seat support member 160 and the right edge of the seat 30. The rear right bracket 154 and the rear left bracket 154 have a portion extending rearwards of the seat 30. The frame spacer 150 is fastened to the vehicle frame 24 by the brackets 152, 154. The frame spacer 150 also has a flange 156 extending rightwardly of the seat 30 between the front right bracket 152 and the rear right bracket 154.

The frame spacer 150 has an edge projecting downwardly from the periphery of the central portion and the brackets 152, 154. The edges extend further downwards than the ribs 151. A portion of the downwardly bent edges rests on the seat support member 160. As can be seen best in FIGS. 14 and 17, the ribs 151 are spaced from the upper portion 160a of the seat support member 160.

Figure 14:
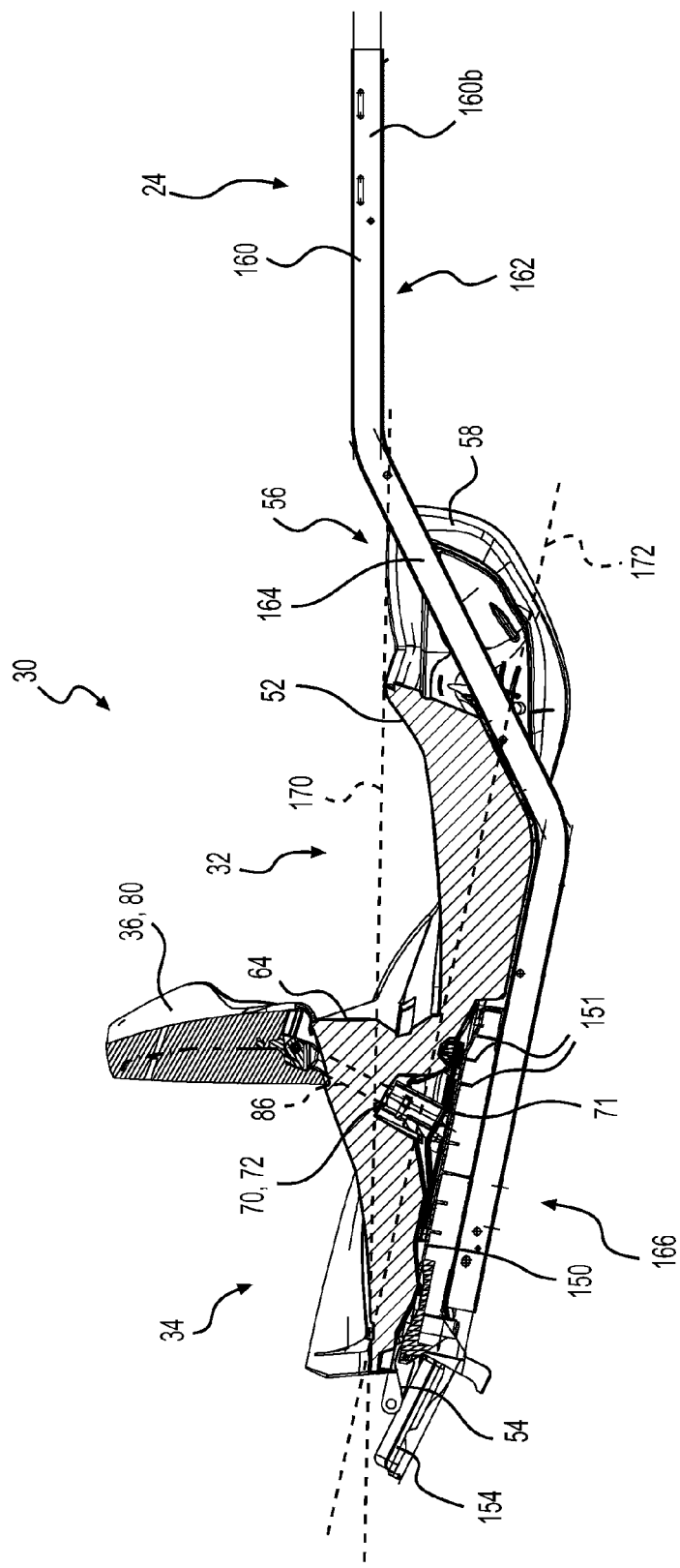
FIG. 14 is a cross-sectional view of the backrest, seat and frame portion of FIG. 12 taken along the line 14-14 shown in FIG. 13.
Figure 15:
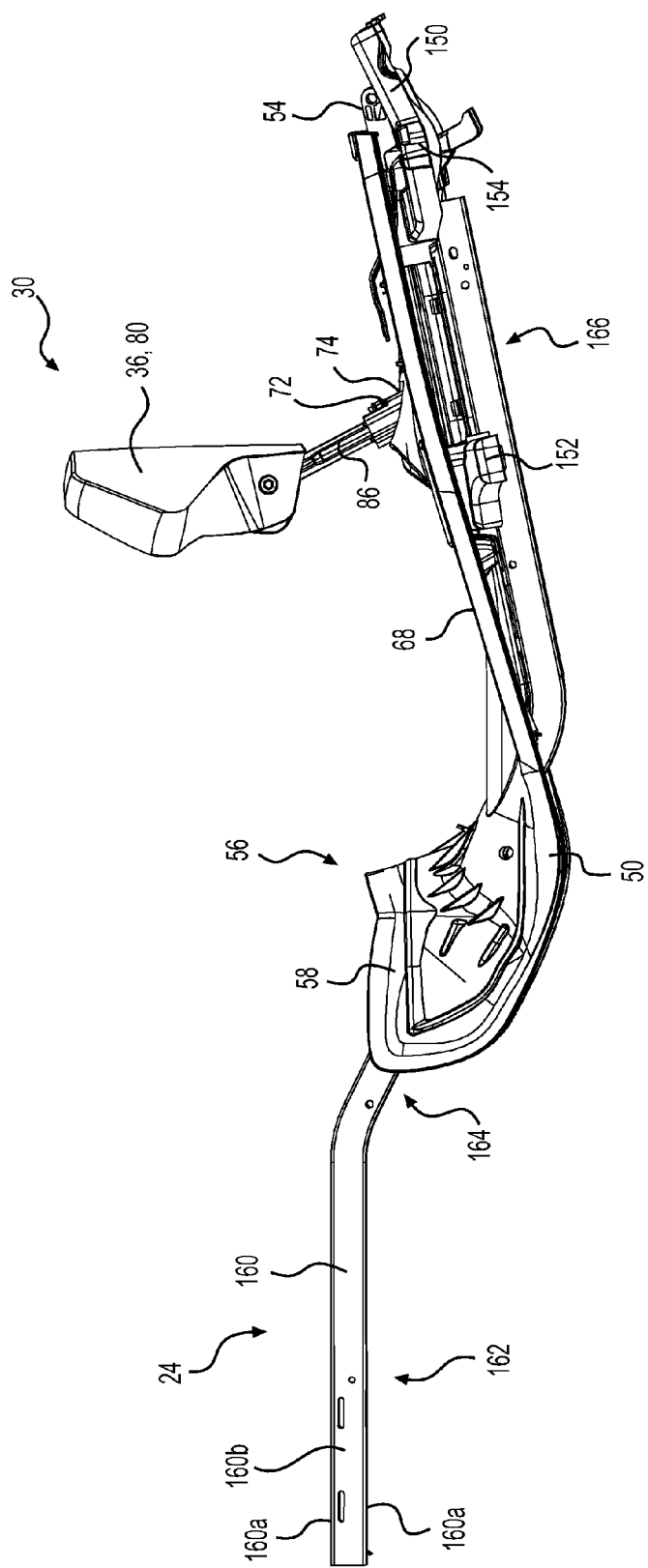
FIG. 15 is a left side elevation view of the backrest, seat and frame portion of FIG. 12 with the seat cushion removed for clarity.
Figure 16:
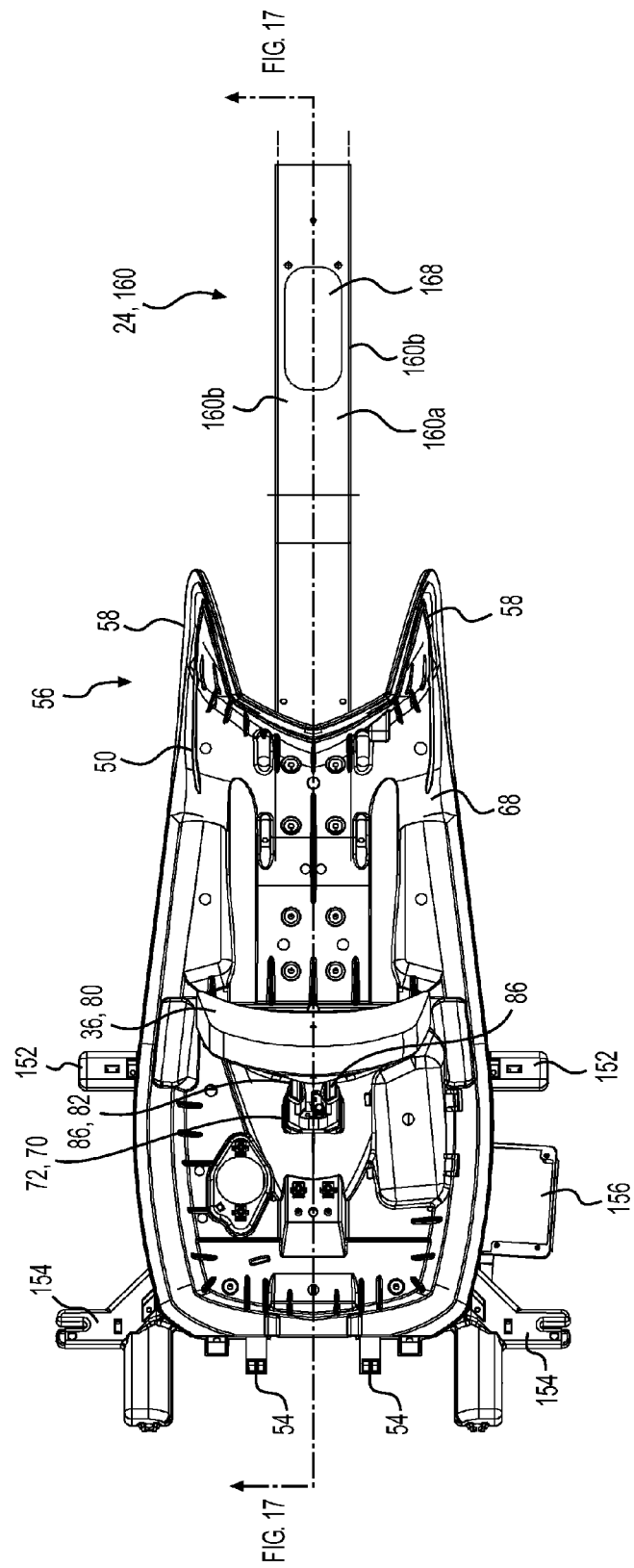
FIG. 16 is a top plan view of the backrest, seat and frame portion of FIG. 15.
Figure 17:
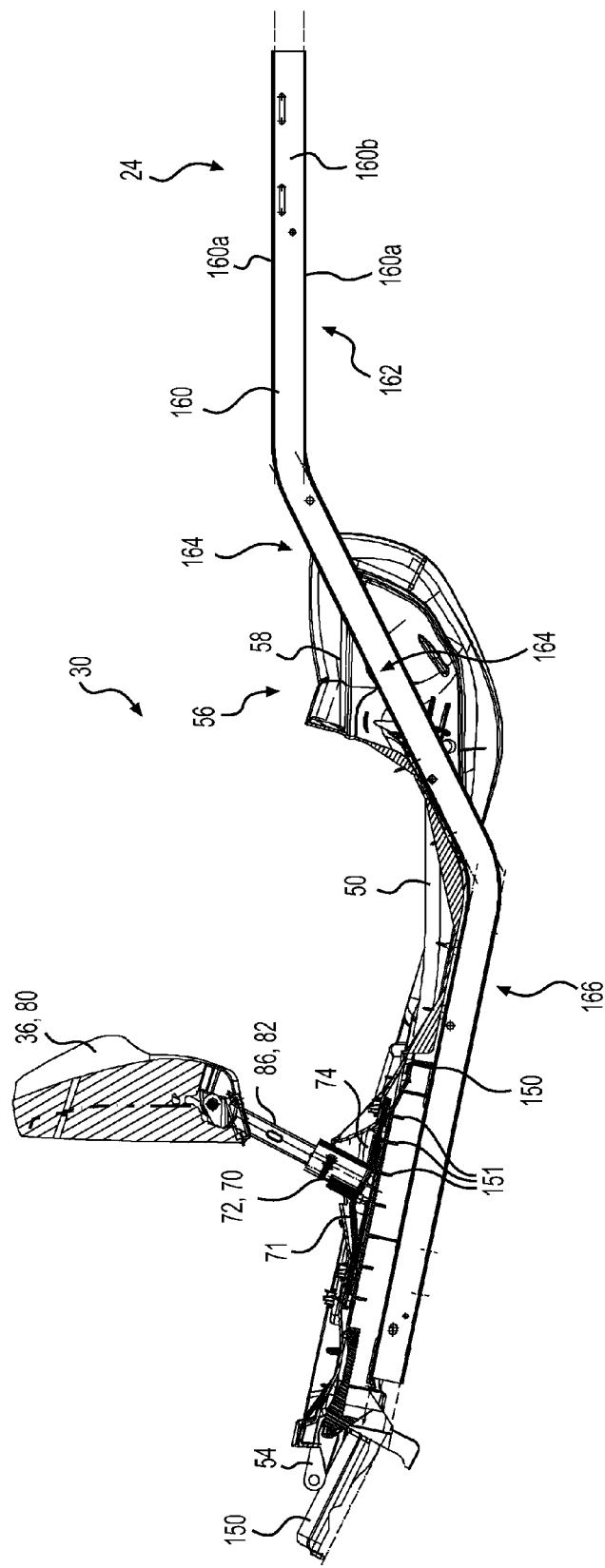
FIG. 17 is a cross-sectional view of the backrest, seat and frame portion taken along the line 17-17 of FIG. 16.

As can be seen in FIG. 14, a line 170 passing through the highest points of the front and rear ends of the seat cushion 52 and disposed in a vertical plane containing the longitudinal centerline 9 passes above the adaptor 72. A line 172 passing through the lowest points of the front and rear ends of the seat cushion 52 and disposed in a vertical plane containing the longitudinal centerline 9 passes through the adaptor 72.

It is contemplated that the frame spacer 150 could also be included as part of the backrest kit.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A kit for assembly of a backrest on a saddle-type seat of a motor vehicle, the vehicle having a vehicle frame, the seat comprising at least one seat passage extending therethrough and being selectively connected to the vehicle frame, the kit comprising:
   a mounting plate adapted to be disposed between the seat and the vehicle frame when the seat is connected to the vehicle frame, the mounting plate having a slot extending therethrough;
   an adapter being one of:
      adapted to be connected to the mounting plate, and
      integrally formed with the mounting plate,
      the adapter including at least one adapter passage having an open end,
      when the backrest is assembled, the adapter extending away from a portion of the mounting plate having the slot extending therethrough and the open end of the at least one adapter passage facing away from the portion of the mounting plate;
   an inverted U-shaped seat mount comprising two posts and a connection member connected between respective first end portions of the two posts, a second end portion of each of the two posts being adapted to be selectively received in the at least one adapter passage through the open end thereof,
   one of a notch and a hole being defined in a surface of at least one of the two posts in the second end portion thereof, the one of the notch and the hole being adapted to selectively receive a lock member for retaining the second end portion of the two posts in the at least one adapter passage;
   a lock adapted to be fixed to at least one of the mounting plate and the adapter, the lock having:
      the lock member adapted to be received in the one of the notch and the hole; and
      a push-plate connected to the lock member for manipulation thereof, the push-plate being adapted to extend through the slot of the mounting plate in a direction generally parallel to a central axis of the at least one adapter passage when the lock is fixed to the at least one of the mounting plate and the adapter;
   a back support being adapted to be pivotally connected to the seat mount; and
   at least one fastener for attaching the mounting plate to the seat.

2. The kit of claim 1, wherein the mounting plate is adapted to be connected to a bottom surface of the seat.

3. The kit of claim 1, wherein the adapter is adapted to be connected to the mounting plate, and further comprising at least one adapter fastener for fastening the adapter to the mounting plate.

4. The kit of claim 1, wherein the adapter is adapted to be disposed at least in part in the at least one seat passage when the adapter is connected to the mounting plate, and the mounting plate is disposed between the seat and the vehicle frame.

5. The kit of claim 1, wherein the second end portion of each of the two posts is adapted to be inserted through a portion of the at least one seat passage into the at least one adapter passage when the mounting plate is disposed between the seat and the vehicle frame.

6. The kit of claim 1, wherein the two posts are adapted to extend forwardly and upwardly from the second end portion to the first end portion with respect to a bottom surface of the seat.

7. The kit of claim 1, wherein each of the two posts defines a respective central axis, the central axes of the two posts being parallel to each other.

8. The kit of claim 1, wherein the second end portion of at least one of the two posts comprises an angled surface adapted to be disposed at least partly in the at least one adapter passage, the angled surface being angled toward a central axis defined by the at least one of the two posts in a direction away from the first end portion thereof.

9. The kit of claim 1, wherein:
the adapter includes a slot extending into the at least one passage; and
the lock member is adapted to extend through the slot of the adapter into the one of the notch and the hole.

10. The kit of claim 1, wherein the at least one adapter passage is two adapter passages, each of the two adapter passages being adapted to selectively receive the second end portion of a corresponding one of the two posts of the seat mount, each of the two adapter passages having a closed end opposite to the open end.

11. The kit of claim 10, further including two resilient spacers, each of the two resilient spacers being adapted to be placed within one of the two adapter passages near the closed end thereof, each of the two resilient spacers being adapted to selectively receive at least a portion of the second end portion of one of the two posts.

12. The kit of claim 1, further comprising a seat cover adapted to cover the seat and having at least one opening aligned with at least one of the at least one seat passage.

13. The kit of claim 1, further comprising a frame spacer adapted to be placed between the mounting plate and the vehicle frame when the mounting plate is disposed between the seat and the vehicle frame.

\* \* \* \* \*

UNITED STATES PATENT AND TRADEMARK OFFICE
CERTIFICATE OF CORRECTION

PATENT NO.         : 9,561,830 B2
APPLICATION NO.    : 14/068597
DATED              : February 7, 2017
INVENTOR(S)        : Patrick Grondin et al.

Page 1 of 1

It is certified that error appears in the above-identified patent and that said Letters Patent is hereby corrected as shown below:

On the Title Page
Abstract, Line 1, "saddle" should read -- straddle --

In the Specification
Description, Column 3, Line 2, "saddle" should read -- straddle --
Description, Column 4, Line 29, "saddle" should read -- straddle --

In the Claims
Claim 1, Column 14, Line 21, "saddle" should read -- straddle --

Signed and Sealed this
Sixteenth Day of May, 2017

Michelle K. Lee
*Director of the United States Patent and Trademark Office*